US 6,643,439 B2

(12) United States Patent
Notomi et al.

(10) Patent No.: US 6,643,439 B2
(45) Date of Patent: Nov. 4, 2003

(54) PHOTONIC CRYSTAL WAVEGUIDE

(75) Inventors: Masaya Notomi, Atsugi (JP); Koji Yamada, Isehara (JP); Akihiko Shinya, Fujisawa (JP); Junichi Takahashi, Isehara (JP); Chiharu Takahashi, Isehara (JP); Itaru Yokohama, Isehara (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/033,766

(22) Filed: Dec. 26, 2001

(65) Prior Publication Data

US 2002/0118941 A1 Aug. 29, 2002

(30) Foreign Application Priority Data

| Dec. 27, 2000 | (JP) | ........................................ 2000-396962 |
| Feb. 28, 2001 | (JP) | ........................................ 2001-053634 |
| Mar. 22, 2001 | (JP) | ........................................ 2001-081919 |

(51) Int. Cl.$^7$ .............................. G02B 6/02; G02B 6/20
(52) U.S. Cl. ........................ 385/125; 385/129; 385/131
(58) Field of Search ................................. 385/125, 129

(56) References Cited

U.S. PATENT DOCUMENTS

| 5,784,400 | A | * | 7/1998 | Joannopoulos et al. ........ 372/96 |
| 5,999,308 | A | * | 12/1999 | Nelson et al. ............... 359/321 |
| 6,130,969 | A | * | 10/2000 | Villeneuve et al. ............ 385/27 |
| 6,175,671 | B1 | * | 1/2001 | Roberts ......................... 385/14 |
| 6,381,389 | B1 | * | 4/2002 | Kosaka .......................... 385/39 |
| 6,468,823 | B1 | * | 10/2002 | Scherer et al. ................. 438/31 |
| 6,532,326 | B1 | * | 3/2003 | Hutchinson et al. ........... 385/37 |
| 2002/0041749 | A1 | * | 4/2002 | Johnson et al. .............. 385/129 |
| 2002/0048422 | A1 | * | 4/2002 | Cotteverte et al. .............. 385/4 |

FOREIGN PATENT DOCUMENTS

EP 1136853 A1 * 9/2001 ........... G02B/06/12

OTHER PUBLICATIONS

Meade, R.D., et al., "Accurate Theoretical Analysis of Photonic Band–Gap Materials", *Physical Review* B 48, 8434 (1993).
Joannopoulos, J.D., et al., "Photonic Crystals", *Princeton University Press, Princeton* (1995).
Mekis, Attila, et al., "Bound States in Photonic Crystal Waveguides and Waveguides Bends", *Physical Review* B 58, 4809 (1998).
Johnson, Steven, G., et al., "Guided Modes in Photonic Crystal Slabs", *Physical Review* B 60, 5751 (1999).
Joannopoulos, J.D., et al., "Photonic Crystal: Putting a New Twist on Light", *Nature* 386, 143 (1997).
Yamada, Koji, et al., "Improved Line–Defect Structure for Photonic–Crystal Waveguides With High Group Velocity", *Optics Communications* 198, Nov. 2001.
Notomi, M., et al., "Singlemode Transmission Within Photonic Bandgap Of Width–Varied Signal–Line–Defect Photonic Crystal Waveguides on SOI Substrates", *Electronics Letters* vol. 37, No. 5, Mar. 2001.

* cited by examiner

Primary Examiner—John D. Lee
Assistant Examiner—Daniel Valencia
(74) Attorney, Agent, or Firm—Kenyon & Kenyon

(57) ABSTRACT

A two-dimensional photonic crystal slab waveguide is provided in which a line defect is formed, wherein a first width which is a distance between centers of nearest two lattice points located on both sides of the line defect is different from a second width which is a corresponding distance in a normal two-dimensional photonic crystal slab waveguide. In addition, a two-dimensional photonic crystal slab waveguide is provided in which low refractive index columns in a optical waveguide part are placed at positions shifted from normal positions in a normal two-dimensional photonic crystal slab.

17 Claims, 15 Drawing Sheets

FIG.3A
PRIOR ART
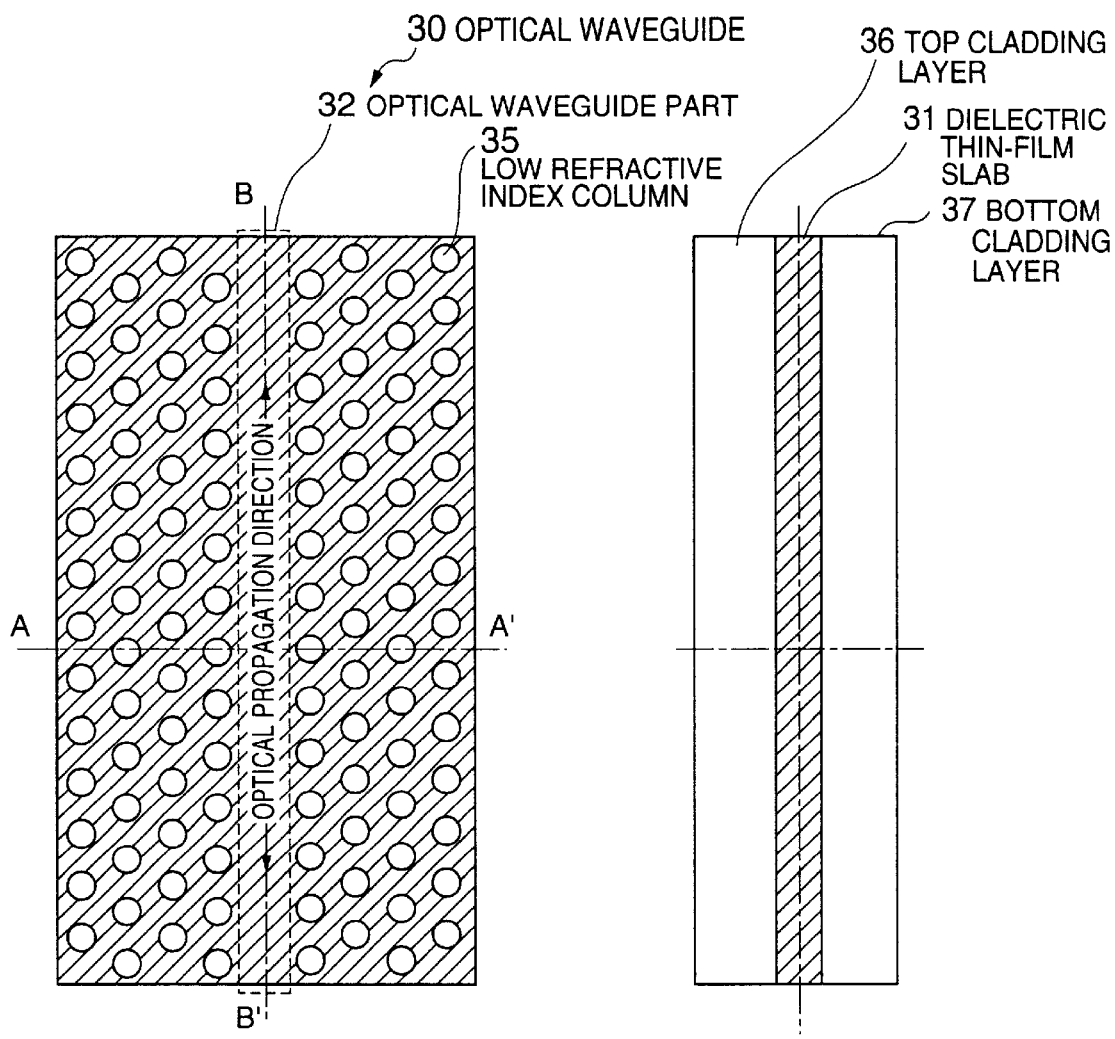
FIG.3C
PRIOR ART
FIG.3B
PRIOR ART
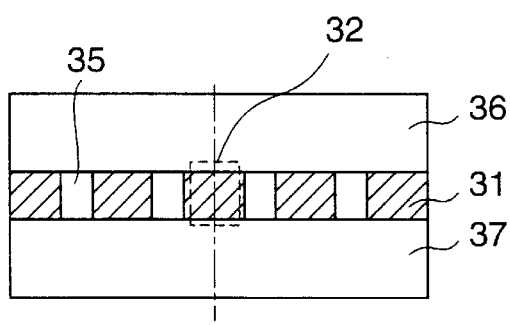

1 OPTICAL WAVEGUIDE PART

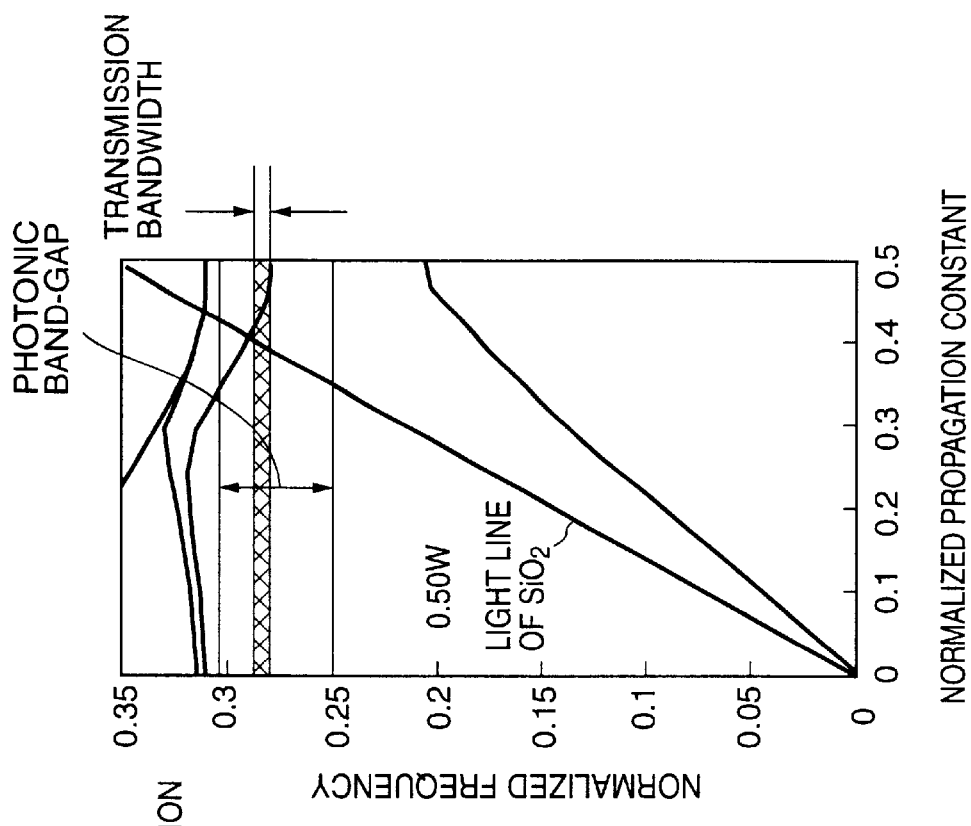
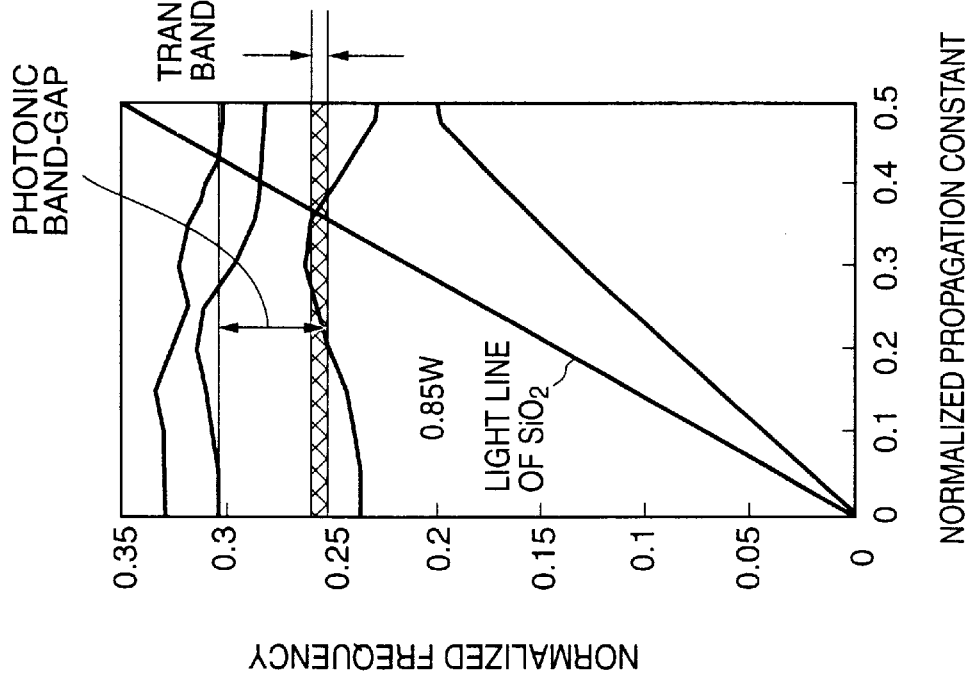

1A OPTICAL WAVEGUIDE PART

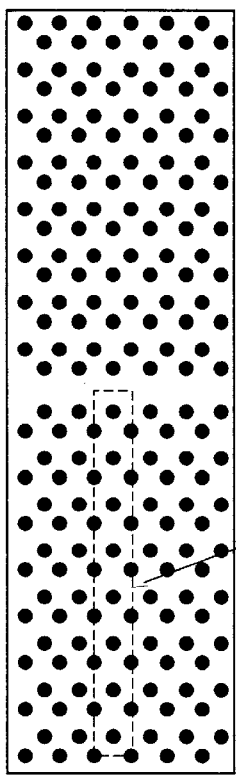
FIG. 12A
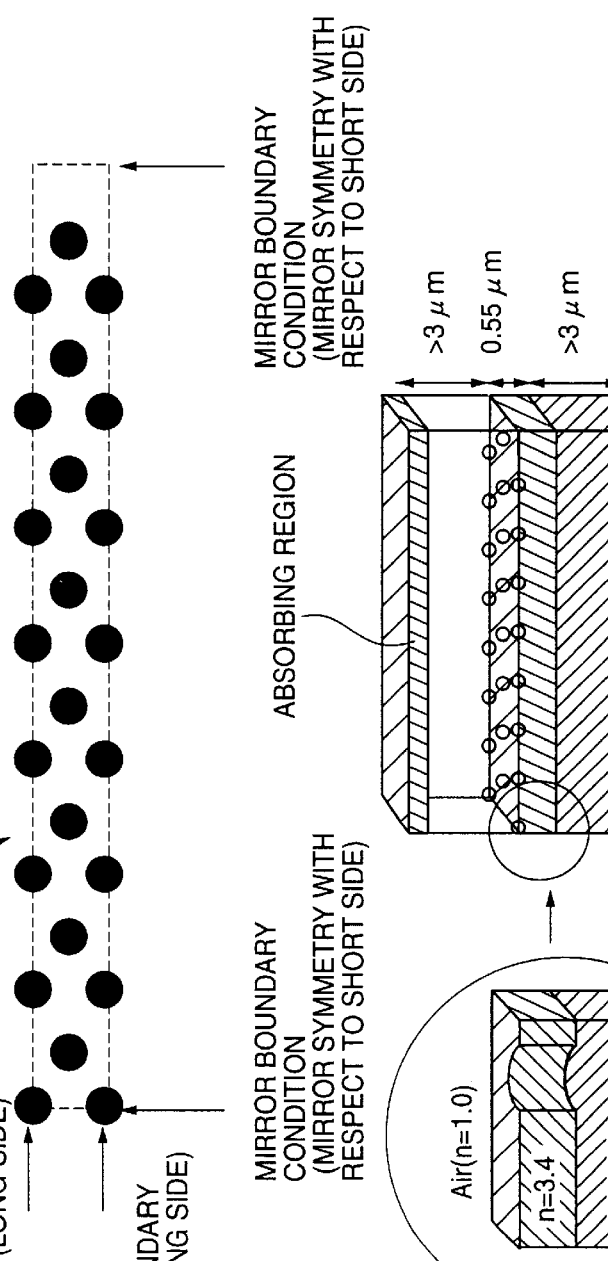
FIG. 12B
FIG. 12C

10 OPTICAL WAVEGUIDE
12 OPTICAL WAVEGUIDE PART
15 LOW REFRACTIVE INDEX COLUMN
OPTICAL PROPAGATION DIRECTION
13 LOW REFRACTIVE INDEX COLUMN A 15
12 OPTICAL WAVEGUIDE PART
16 TOP CLADDING LAYER
11 DIELECTRIC THIN-FILM SLAB
17 BOTTOM CLADDING LAYER
13

20 OPTICAL WAVEGUIDE
22 OPTICAL WAVEGUIDE PART
25 LOW REFRACTIVE INDEX COLUMN
OPTICAL PROPAGATION DIRECTION

22 OPTICAL WAVEGUIDE PART
26 TOP CLADDING LAYER
21 DIELECTRIC THIN-FILM SLAB
27 BOTTOM CLADDING LAYER

PHOTONIC CRYSTAL WAVEGUIDE

BACKGROUND OF THE INVENTION

1. Field of the Invention

The present invention relates to a photonic crystal waveguide which can be used as a basic structure which forms photonic devices such as lasers and photonic ICs used for optical information processing, optical transmission and the like.

2. Description of the Related Art

In a conventional photonic device, since light confinement is carried out by using difference of refractive indices, a space for light confinement must be large. Therefore, the device can not be configured very small. In addition, when a steeply bent waveguide is used in order to increase the scale of integration of the device, scattering loss occurs. Thus, it is difficult to integrate photonic circuits and it is difficult to downsize the photonic device. As a result, the size of the photonic device is much larger than that of an electric device. Therefore, the photonic crystal is expected to be a new photonic material which can solve the above-mentioned problem, in which the photonic crystal can perform light confinement by a concept completely different from the conventional one.

The photonic crystal has an artificial multidimensional periodic structure in which periodicity, which is almost the same as light wavelength, is formed by using more than one kinds of mediums having different refractive indices, and the photonic crystal has a band structure of light similar to a band structure of electron. Therefore, forbidden band of light (photonic band-gap) appears in a specific structure so that the photonic crystal having the specific structure functions as a nonconductor for light.

It is theoretically known that, when a line defect which disturbs periodicity of the photonic crystal is included in the photonic crystal, an optical waveguide which completely confines light and has a waveguiding mode in a frequency region of the photonic band-gap can be realized (J. D. Joannopoulos, P. R. Villeneuve, and S. Fan, Photonic Crystal: putting a new twist on light, Nature 386,143 (1997)). J. D. Joannopoulos and others applied a line defect in a two-dimensional photonic crystal in which cylindrical columns having large refractive index almost the same as that of a semiconductor are arranged on a square lattice of lattice constant "a" which is about light wavelength and the radius of each cylindrical column is a/5, and, J. D. Joannopoulos and others theoretically indicated that an optical waveguide having no scattering loss even when it is steeply bent can be realized. This waveguide can be very important for realizing a large scale integrated optical circuit.

In order to realize the optical waveguide for forming the large scale integrated optical circuit, it is necessary to realize a single waveguiding mode in the photonic band-gap frequency band. When a multi-mode waveguide having a plurality of modes is used as a bent waveguide, there is a problem, for example, in that a part of mode may be converted into a different mode in a bending part. Thus, the multi-mode waveguide can not be used as an effective bent waveguide necessary for realizing the large scale integrated optical circuit. That is the reason for requiring the single-mode. In addition, the multi-mode waveguide is not suitable for high-speed communication.

Some types of waveguides have been manufactured. In the various waveguides, waveguides using the two-dimensional photonic crystal is promising since it is very difficult to fabricate waveguides by a three-dimensional photonic crystal which has full band-gap.

When using the two-dimensional photonic crystal for the waveguide, it is necessary to confine light in the direction perpendicular to the two-dimensional plane. Several methods has been proposed as the method of light confinement. In the methods, using a two-dimensional photonic crystal slab on oxide cladding is preferable since a structure having a large area can be easily manufactured by the two-dimensional photonic crystal slab on oxide cladding and it is easy to add various function elements in the same structure. The two-dimensional photonic crystal slab on oxide cladding is based on a structure in which a thin semiconductor film of high refractive index (from 3 to 3.5) is deposited on a dielectric of low refractive index (oxide or polymer in many cases, the refractive index is about 1.5).

In addition, a substrate called Silicon-On-Insulator (SOI) substrate is being applied to LSIs, and high-quality SOI substrate can be manufactured in recent years. The SOI substrate is formed by providing a silicon (Si) thin-film on silica ($SiO_2$). By using the SOI substrate, there is a merit that the two-dimensional photonic crystal slab on oxide cladding having high quality can be easily manufactured. The merit can not be obtained by using other structures (for example, two-dimensional photonic crystal air-bridge slab in which cladding of both sides is air).

As mentioned above, the two-dimensional photonic crystal slab on oxide cladding has the advantage of being easier to manufacture than the two-dimensional photonic crystal air-bridge slab and the like. However, the structure has following problems so that the single waveguiding mode was not realized in the photonic band-gap frequency band according to the conventional structure.

In waveguiding modes generated by the line defect in the optical waveguide of the two-dimensional photonic crystal slab, light is strongly confined in the directions of the two-dimensional plane by the photonic band-gap and scattering loss does not exist in the directions. However, light is generally leaky in a high frequency region above a light line of cladding, that is, the light may be leaked to the cladding. (The light line represents the lowest frequency, with respect to propagation constant, by which light can transmit in the cladding, and, the light line can be represented by a line defined by w=ck/n (w: angular frequency, c: light speed, n: refractive index, k: wave number).) Therefore, it is customary to use a low frequency region below the light line such that the waveguide light does not leak to cladding layers of both sides.

FIGS. 1A and 1B are schematic diagrams of a structure of a single missing-hole line defect photonic crystal waveguide of a typical air-hole type according to a conventional technology. FIG. 1A shows a top view and FIG. 1B shows a B–B' section view. The conventional single missing-hole line defect photonic crystal waveguide can be also called as a normal two-dimensional photonic crystal slab waveguide in this specification. In FIGS. 1A and 1B, 5 indicates an optical waveguide part, 2 indicates an Si layer, 3 indicates an $SiO_2$ layer which is a cladding layer, and 4 indicates an air-hole triangle lattice point, in which the lattice constant is represented as "a". Each air-hole is a cylindrical column or a polygon column which penetrates the Si layer 2. The diameter of the air-hole is 0.215 μm in this example. In the air-hole triangle lattice, the air-hole is placed in each lattice point of the triangle lattice. The triangle lattice is a regular lattice in which lattice points are placed on vertices of regular triangles which are arranged over the two-dimensional plane.

As representative two-dimensional photonic crystals having the photonic band-gap, there are two structures. One is a structure in which columns of high refractive index are provided in air. Another is a structure in which air-holes are provided in a high refractive index layer like the above-mentioned example. (The air-hole can be also called a low refractive index column or a low refractive index cylindrical column.) The former structure, which was used by J. D. Joannopoulos and others, requires a cladding layer for supporting the columns. Since the refractive index of the cladding layer is larger than that of the air which is a core for the line defect waveguide, very long columns are necessary for preventing light leakage to the upper and lower sides so that manufacturing such structure becomes very difficult. On the other hand, as for the latter structure, since the air-hole can stand by itself, the cladding layer can be freely chosen, and it is easy to determine a core having refractive index larger than that of the cladding layer. Thus, limitation on manufacturing is small so that it is easy to select structural condition that light hardly leak to the upper and lower sides.

In addition, although the holes can be placed on the two-dimensional plane of the high refractive index plate of the photonic crystal in various way, a structure in which the holes (cylindrical columns or polygon columns) are arranged in a triangle lattice pattern is known to have the photonic band-gap ranging over a wide frequency band. This means that this structure functions as a nonconductor for light in wide frequency band. This structure is preferable since frequency can be selected from wide rage frequencies when designing a waveguide.

FIG. 2 shows a dispersion relation of waveguiding modes of a conventional typical single missing-hole line defect photonic crystal waveguide. When such waveguide is formed by using the two-dimensional photonic crystal slab on oxide cladding, the waveguiding modes become as shown in FIG. 2. In the figure, normalized frequency represented by (lattice constant/wavelength) which is a dimensionless number is used. In addition, normalized propagation constant represented by (wave number×lattice constant/$2\pi$) is used. The light line of the cladding ($SiO_2$, refractive index 1.46) is also shown in FIG. 2.

In the conventional structure shown in FIG. 2, the waveguiding mode which satisfies the condition that light does not leak to the cladding layer is only in a region circled by an ellipse which is below the light line. However, inclination of the waveguiding mode in the region is very small so that group velocity (energy propagation velocity) of the waveguiding mode, which is determined depending on the inclination, is very small. There are many problems for using the waveguide having the waveguiding mode of very small group velocity since time for light transmission becomes long. In addition, since heterogeneity exist in an actual structure to some extent, the mode of very small group velocity is affected by the heterogeneity so that light may not propagate. In addition, in the mode above the light line (high frequency region), light can not propagate since diffraction loss in the photonic crystal is too large. That is, light in the photonic crystal waveguide propagates while being perturbed by periodic structure of the photonic crystal, and light leaks to the cladding layer by diffraction loss in the mode above the light line.

The inventors actually manufactured the conventional single missing-hole line defect photonic crystal waveguide. However, light propagation was not detected at all. The cause of the problem is that there is no realistically usable waveguiding mode which has a group velocity which is not too small below the light line, and that the diffraction loss is very large in the region above the light line.

In order to use the mode below the light line, it is necessary to move the light line upward or to move the waveguiding mode appropriately in the graph of FIG. 2. However, as long as the oxide cladding structure is used, since the position of the light line is determined by the refractive index of the cladding, the position of the light line can not be changed largely. As for the waveguiding mode, as long as the single-mode within the band-gap should be used, it is difficult to obtain a waveguiding mode having large group velocity below the light line by using the structure shown in FIG. 1. As for crystal structures other than the triangle lattice such as square lattice, it is more difficult to obtain such waveguiding mode. Therefore, it is very difficult to use waveguiding modes below the light line.

The conventional technology will be described further from another viewpoint in the following.

FIGS. 3A–3C are figures for explaining the conventional single missing-hole line defect photonic crystal waveguide (optical waveguide). FIG. 3A shows a top view of the optical waveguide, FIG. 3B shows an A–A' section view, and FIG. 3C shows a B–B' section view.

In FIG. 3A, the optical waveguide 30 includes dielectric thin-film slab 31 (which corresponds to the above-mentioned high refractive index plate) sandwiched between a top cladding layer 36 and a bottom cladding layer 37. A photonic crystal structure is formed in the dielectric thin-film slab 31 by providing low refractive index cylindrical columns 35 having lower refractive index than that of the dielectric thin-film slab 31 in a triangle lattice pattern. In addition, one line of the low refractive index cylindrical columns 35 is replaced by a dielectric having the same refractive index as the dielectric thin-film slab 31 such that the part of the one line can be used as an optical waveguide part 32. Arrows ←→ in the optical waveguide part 32 indicate optical propagation directions. The waveguide shown in FIG. 1 is an example of a structure shown in FIG. 3 in which the top cladding layer 36 and the low refractive index cylindrical column 35 are air, the bottom cladding layer 37 is $SiO_2$, and the dielectric thin-film slab 31 is Si.

Here, it is assumed that refractive indices of the dielectric thin-film slab 31, the low refractive index cylindrical column 35, the top cladding layer 36 and the bottom cladding layer 37 are $n_1=3.5$, $n_2=1.0$, $n_3=n_4=1.46$ respectively, and that radius of the low refractive index cylindrical column 35 is 0.275a and thickness of the dielectric thin-film slab 31 is 0.50a, in which "a" represents the lattice constant (triangle lattice in this example) of the photonic crystal. The low refractive index cylindrical column 35 having the refractive index 1.0 is the same as an air-hole. Characteristics of the optical waveguide 30 will be described in the following.

These refractive indices of the optical waveguide 30 correspond to those of Si, air (vacuum) and $SiO_2$ which are often used for forming waveguides targeted for infrared light for optical communication having a wavelength about 1.55 $\mu$m.

Since a relative dielectric constant corresponds to a square of refractive index, "relative dielectric constant" or "dielectric constant" can be used instead of "refractive index" in this specification.

FIGS. 4A–4C are figures for explaining waveguiding modes of the above-mentioned optical waveguide. FIG. 4A shows dispersion curves of waveguiding modes which can propagate through the optical waveguide part. The dispersion curves of waveguiding modes are obtained by using a plane wave expansion method (R. D. Meade et al., Physical Review B 48,8434 (1993)) to which periodic boundary condition is applied. This figure is similar to FIG. 2. FIG. 4B shows magnetic field component perpendicular to the dielectric thin-film slab according to a mode 1 in FIG. 4A, and FIG. 4C shows magnetic field component perpendicular to the dielectric thin-film slab according to a mode 2 in FIG. 4A.

Each amount in FIG. 4A is normalized by the lattice constant or speed of light c. The diagonally shaded regions correspond to the outside of photonic band-gap (J D. JoannoPoulos, R D. Meade, J N. Winn, "Photonic Crystals", Princeton University Press, Princeton (1995)), that is, the diagonally shaded areas show regions in which light can not be confined in the optical waveguide part 32 (A. Mekis et al., Physical Review B 58,4809 (1998)).

In the vertical line hatching region, power of light confinement caused by difference of refractive indices between the dielectric thin-film slab 31 and the top cladding layer 36/bottom cladding layer 37 is weakened so that light can not be confined in the optical waveguide part 32 (S G. Johnson et al., Physical Review B 60,5751 (1999)). The vertical line hatching region corresponds to the before-mentioned above region of the light line. That is, a region to be considered used for the waveguide is only a white region in FIG. 4A.

As is understood by the figure, two waveguiding modes 1 and 2 exist in the white region of the conventional optical waveguide 30. Further waveguiding modes may exist when the band-gap is wider, however, the two modes 1 and 2 will be considered here for the sake of simplicity. The mode 1 corresponds to the mode circled by the ellipse in FIG. 2, and the mode 2 corresponds to the mode of upper dotted line.

In these two modes 1 and 2, the mode 1 in the low frequency side generally has magnetic field distribution shown in FIG. 4B, and the mode 2 in the high frequency side generally has magnetic field distribution shown in FIG. 4C.

In these waveguiding modes 1 and 2, the mode 1 is practical since the mode 1 has electric field distribution almost the same as that of a general single-mode waveguide. On the other hand electric field distribution of the mode 2 is largely different from that of the general signal-mode waveguide. Therefore, it is difficult to conduct light from an outside circuit by using the mode 2. That is, the mode 2 is not a practical waveguiding mode. In addition, in the same way, it is clear, from general argument of waveguide, that waveguiding modes of higher frequency side which appears when the band-gap is wide is not practical since the waveguiding mode is largely different from that of the general single-mode waveguide.

Thus, the mode 1 is used for the conventional waveguide. However, as is known from FIG. 4A, since the frequency hardly change even when the propagation constant change in this mode 1, the mode 1 has a defect that usable frequency band is very small. In this example, the frequency band is about 1%.

The fact that the frequency hardly change even when the propagation constant change means that the group velocity of the waveguiding mode is very low. Therefore, the conventional waveguide has a defect that transmission time becomes very long, and propagation loss due to absorption and scattering loss in waveguide becomes large.

SUMMARY OF THE INVENTION

An object of the present invention is to solve the above-mentioned problems in the photonic crystal waveguide and to provide a two-dimensional photonic crystal slab waveguide allowing single-mode transmission in which group velocity is increased and propagation loss is decreased.

The above object can be achieved by a two-dimensional photonic crystal slab waveguide in which a part of holes in a lattice structure of a two-dimensional photonic crystal slab do not exist linearly so that a line defect is formed, wherein:

a first width which is a distance between centers of nearest two lattice points located on both sides of the line defect is different from a second width which is a distance between centers of nearest two lattice points located on both sides of a line defect in a normal two-dimensional photonic crystal slab waveguide which simply lacks holes of a single line.

In the two-dimensional photonic crystal slab waveguide, the first width may a value from 0.5 times to 0.85 times of the second width.

According to the invention, since the first width which is a distance between centers of nearest two lattice points located on both sides of the line defect is different from the second width which is a corresponding distance in a normal two-dimensional photonic crystal slab waveguide, an optical waveguide which can form a single waveguiding mode having large group velocity below the light line can be provided. The two-dimensional photonic crystal slab waveguide may be called a single missing-hole line defect photonic crystal waveguide.

In the two-dimensional photonic crystal slab waveguide, the lattice structure may be formed by air-hole triangle lattices, and the two-dimensional photonic crystal slab waveguide may include an oxide cladding or a polymer cladding. In addition, the two-dimensional photonic crystal slab waveguide may be formed by using a Silicon-On-Insulator (SOI) substrate.

In the two-dimensional photonic crystal slab waveguide, the first width may be wider than the second width in which a single-mode appears in a high frequency side of a light line of cladding in a dispersion relation of waveguiding modes of the two-dimensional photonic crystal slab waveguide having the first width, and the first width may a value from 1.3 times to 1.6 times of the second width.

According to the invention, an optical waveguide can be provided which can form a single waveguiding mode of low loss above the light line can be provided.

The above object can be also achieved by a two-dimensional photonic crystal slab waveguide in which dielectric cylindrical or polygon columns having lower refractive index than that of a dielectric thin-film slab are provided in the dielectric thin-film slab in a two-dimensional lattice pattern, and the dielectric thin-film slab is sandwiched by a top cladding layer and a bottom cladding layer which have lower refractive index than that of the dielectric thin-film slab, wherein:

positions of dielectric columns which form one line of the lattice of two-dimensional photonic crystal slab for an optical waveguide part are shifted in an optical propagation direction.

That is, the dielectric columns in an optical waveguide part in the two-dimensional photonic crystal slab waveguide are located at positions which are shifted in an optical propagation direction from positions at which the dielectric columns should be positioned in a normal two-dimensional photonic crystal slab.

Also according to the invention, an optical waveguide which can form a single waveguiding mode having large group velocity below the light line can be provided. The dielectric cylindrical or polygon columns, or the dielectric columns are low refractive index columns having lower refractive index than that of the dielectric thin-film slab.

In the two-dimensional photonic crystal slab waveguide, a first diameter of the dielectric columns in the optical waveguide part may be different from a second diameter of other dielectric columns located in parts other than the optical waveguide part, and the first diameter is a value by which the dielectric columns does not contact with the other dielectric columns.

In addition, in the two-dimensional photonic crystal slab waveguide, positions of dielectric columns which form one line of the lattice of two-dimensional photonic crystal slab for an optical waveguide part may be shifted in an optical propagation direction by a half of the lattice constant of the normal two-dimensional photonic crystal slab.

That is, each dielectric column of dielectric columns in the optical waveguide part may be apart from a position at which the each dielectric column should be positioned in the normal two-dimensional photonic crystal slab by a half of the lattice constant of the normal two-dimensional photonic crystal slab.

In the two-dimensional photonic crystal slab waveguide, the dielectric cylindrical or polygon columns may be arranged in a triangle lattice pattern having a lattice constant "a", a radius or a half-breadth of the dielectric cylindrical or polygon columns is from 0.2a to 0.45a, and the radius or half-breadth is determined such that the dielectric cylindrical or polygon columns do not contact with dielectric columns in the optical waveguide part.

In the two-dimensional photonic crystal slab waveguide, a refractive index of the dielectric thin-film slab may be from 3.0 to 4.5, and each of refractive indices of parts other than the dielectric thin-film slab may be from 1.0 to 1.7.

In addition, in the two-dimensional photonic crystal slab waveguide, the dielectric cylindrical or polygon columns may be arranged in a square lattice pattern having a lattice constant "a", a radius or a half-breadth of the dielectric cylindrical or polygon columns is from 0.35a to 0.45a, and the radius or half-breadth is determined such that wherein the dielectric cylindrical or polygon columns do not contact with dielectric columns in the optical waveguide part.

Further, in the two-dimensional photonic crystal slab waveguide, silicon, germanium, gallium arsenide base compound, indium phosphide base compound, or indium antimony base compound may be used as a material of the dielectric thin-film slab, and silica, polyimide base organic compound, epoxy base organic compound, acrylic base organic compound, air or vacuum may be used as a material of parts other than the dielectric thin-film slab.

BRIEF DESCRIPTION OF THE DRAWINGS

Other objects, features and advantages of the present invention will become more apparent from the following detailed description when read in conjunction with the accompanying drawings, in which:

FIGS. 1A and 1B are schematic diagrams of a structure of a single missing-hole line defect photonic crystal waveguide of a typical air-hole type according to a conventional technology, in which FIG. 1A shows a top view and FIG. 1B shows a B–B' section view;

FIGS. 3A–3C are figures for explaining the conventional single missing-hole line defect photonic crystal waveguide (optical waveguide), in which FIG. 3A shows a top view of the optical waveguide, FIG. 3B shows an A–A' section view, and FIG. 3C shows a B–B' section view;

FIGS. 5A and 5B are figures showing a structure of a single missing-hole line defect photonic crystal waveguide according to a first embodiment of the present invention, in which FIG. 5A shows a top view and FIG. 5B shows a B–B' section view;

FIGS. 8A and 8B show results of theoretical calculation of waveguiding mode dispersion in the cases where the width of the optical waveguide part is 0.85W and 0.50W respectively;

FIGS. 9A and 9B are figures showing a structure of a single missing-hole line defect photonic crystal waveguide according to a second embodiment of the present invention, in which FIG. 9A shows a top view and FIG. 9B shows a B–B' section view;

FIGS. 12A–12C are figures for explaining about mode calculation of the two-dimensional photonic crystal waveguide;

FIGS. 13A–13B are figures for explaining a two-dimensional photonic crystal slab waveguide of an example 3-1, in which FIG. 13A shows a top view of the optical waveguide and FIG. 13B shows an A–A' section view;

FIGS. 15A–15B are figures for explaining a two-dimensional photonic crystal slab waveguide of an example 3-2, in which FIG. 15A shows a top view of the optical waveguide and FIG. 15B shows an A–A' section view.

DETAILED DESCRIPTION OF THE PREFERRED EMBODIMENTS

The optical waveguide in the embodiments is structured such that, in a two-dimensional photonic crystal slab waveguide in which a part of holes in a lattice structure of a two-dimensional photonic crystal slab do not exist linearly so that a line defect is formed, a first width which is a distance between centers of nearest two lattice points located on both sides of the line defect is narrower (first embodiment) or wider (second embodiment) from a second width which is a distance between centers of nearest two lattice points located on both sides of a line defect in a normal two-dimensional photonic crystal slab waveguide which simply lacks holes of a single line. By forming the waveguide in this way, a structure having low loss and large group velocity, and enabling a single waveguiding mode can be realized while light confinement is performed by using photonic band-gap and difference of refractive indices.

In addition, the same effect can be obtained by shifting the position of one line of low refractive index columns (air-holes and the like) in the light propagation direction, or, in addition to that, by changing the radius of the holes (third embodiment).

The two-dimensional photonic crystal slab is a photonic crystal in which dielectric cylindrical or polygon columns having lower refractive index than that of a dielectric thin-film slab are provided in the dielectric thin-film slab in a two-dimensional lattice pattern, and the dielectric thin-film slab is sandwiched by a top cladding layer and a bottom cladding layer which have lower refractive index than that of said dielectric thin-film slab. The top or bottom cladding layer and/or the dielectric cylindrical or polygon columns may be air or vacuum.

In the following, embodiments of the present invention will be described.

<First Embodiment>

First, the first embodiment of the present invention will be described in the following.

Figure 5A:
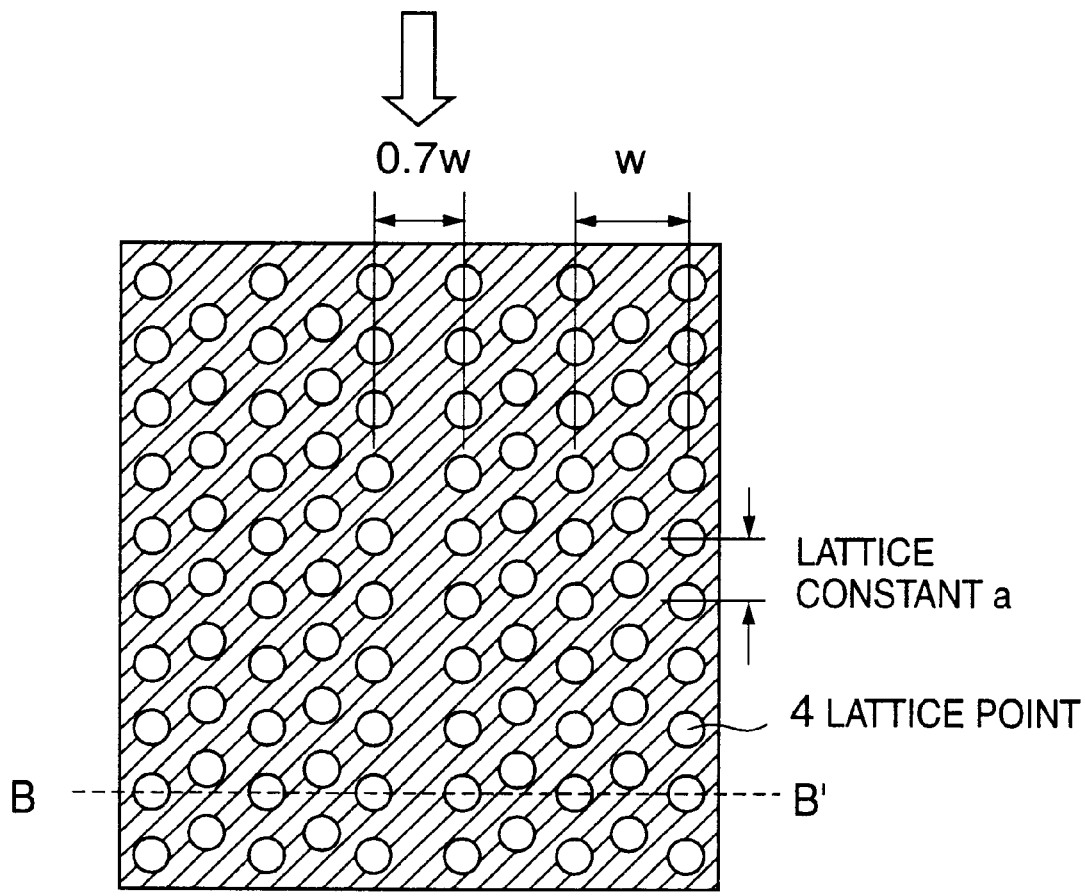
Figure 5B:
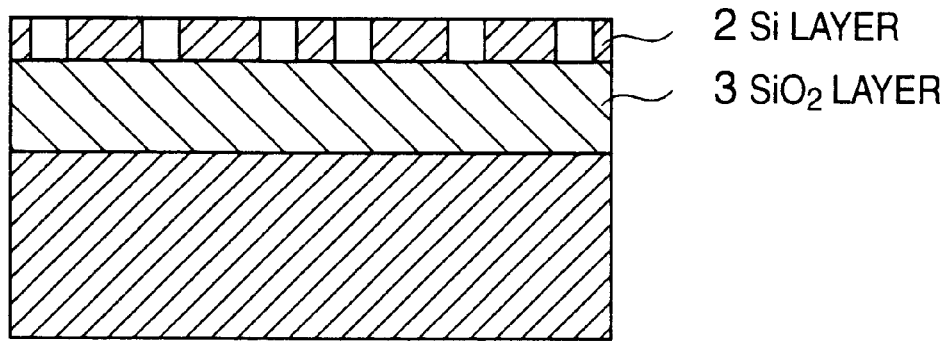

FIGS. 5A and 5B are figures showing a structure of a single missing-hole line defect photonic crystal waveguide according to a first embodiment of the present invention. The single missing-hole line defect photonic crystal waveguide can also be called as a two-dimensional photonic crystal slab waveguide. FIG. 5A shows a top view and FIG. 5B shows a B–B' section view. In this embodiment, single line defect is formed in a two-dimensional photonic crystal slab on oxide cladding by removing holes of the single line, and, width of the line defect (in other words, width of the optical waveguide part 5) is tuned by shifting positions of the whole crystal lattices of both sides of the line defect. As a result, single waveguiding mode having a large group velocity below the light line of the cladding can be obtained. In first and second embodiments, the width of the line defect and the width of the optical waveguide part have the same meaning, in which the width is a distance between centers of nearest two lattice points located on both sides of the line defect.

That is, an air-hole triangle lattice photonic crystal of lattice constant a=0.39 $\mu$m was manufactured on an SOI substrate consisting of an Si layer 2 of 0.2 $\mu$m thickness and an $SiO_2$ layer of 2, 3 $\mu$m thickness by electron beam lithography and dry etching, and, various single-line defects of various width were applied to the air-hole triangle lattice photonic crystal. Tuning of the width of a waveguide part is performed by shifting crystal lattices of both sides of the line defect by a predetermined distance in a direction perpendicular to the line defect.

The width of the line defect of a normal single missing-hole line defect photonic crystal waveguide (which may be called a normal width W) is defined as a distance between centers of nearest lattice points 4 of both sides of the line defect. Width of the line defect of this embodiment can be represented by a constant number—times of the normal width W. The photonic crystal itself has the photonic band-gap between a wavelength 1.35 $\mu$m and a wavelength 1.57 $\mu$m. Thus, transmission of light was not observed in a part having no defect in the crystal within the wavelength range. Next, light transmission spectrum for each line defect was measured. As for a simple (normal) single line defect (the width is 1.0W), light transmission was not observed in the photonic bad-gap frequency range. On the other hand, when using a waveguide having the width of 0.7W, light transmission was clearly observed in a frequency range of the photonic band-gap.

Figure 2:
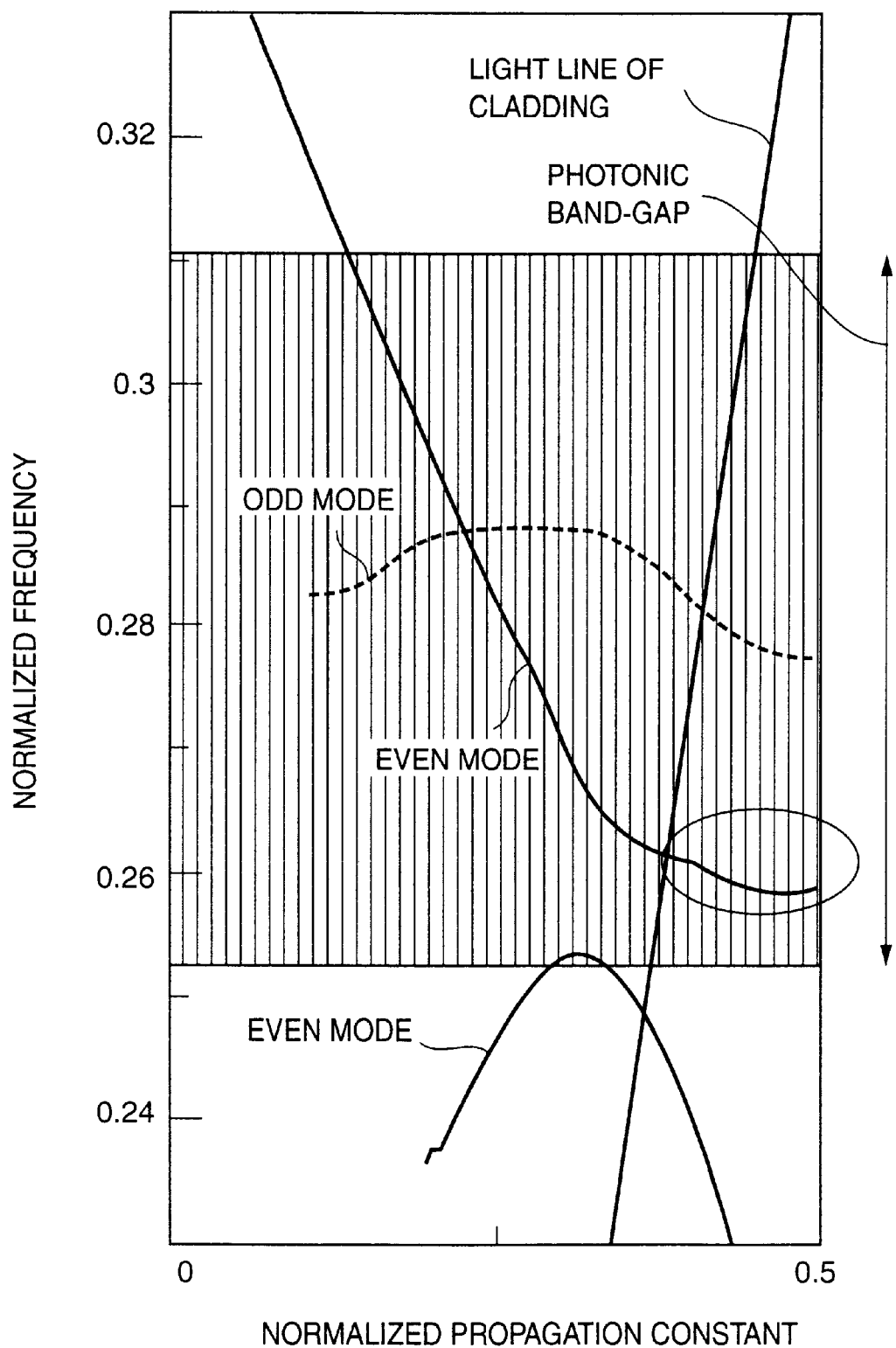
FIG. 2 shows a dispersion relation of waveguiding modes of a conventional typical single missing-hole line defect photonic crystal waveguide.
Figure 6:
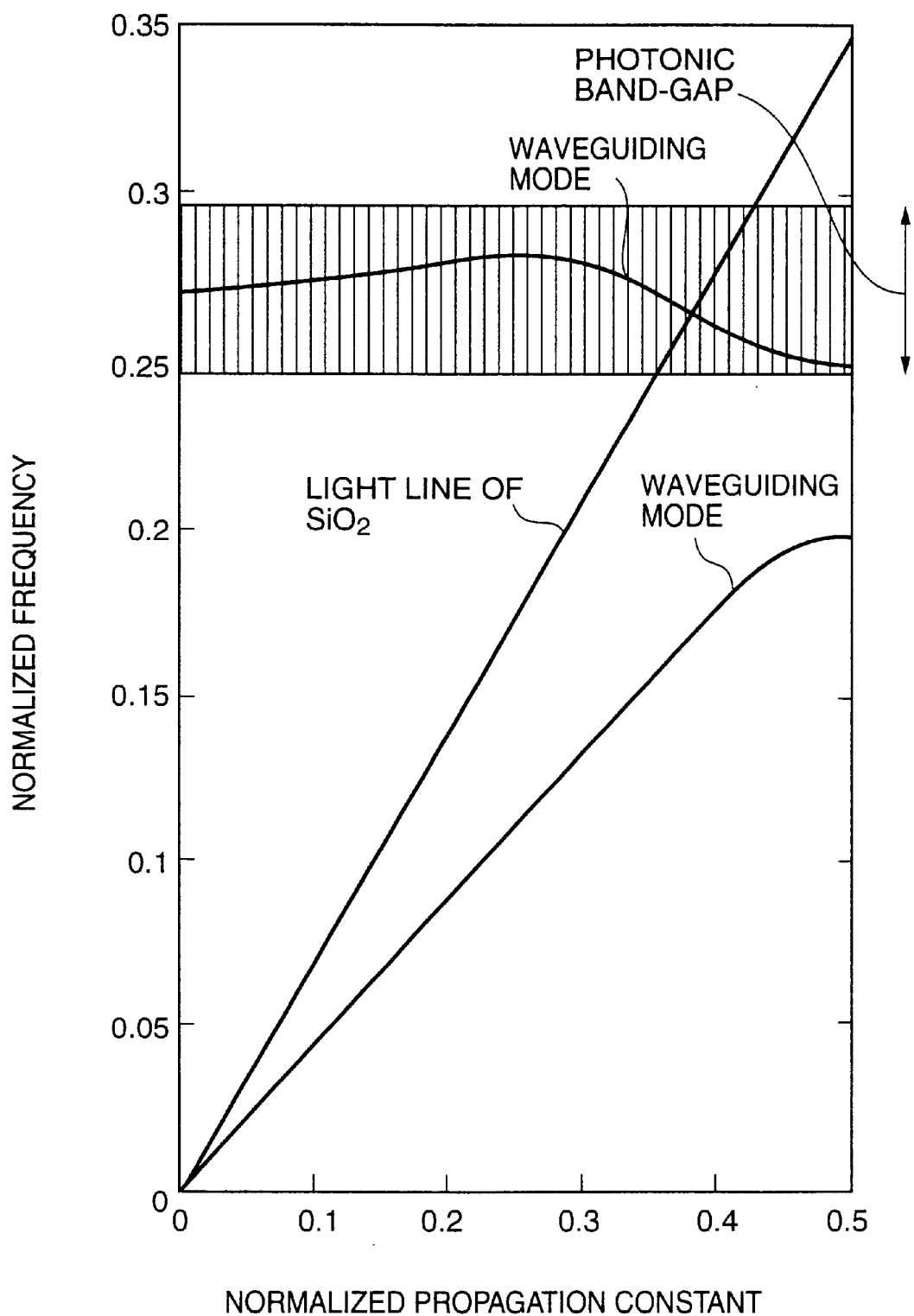
FIG. 6 shows a dispersion relation of waveguiding modes of the single missing-hole line defect photonic crystal waveguide according to the first embodiment of the present invention.
Figure 7:
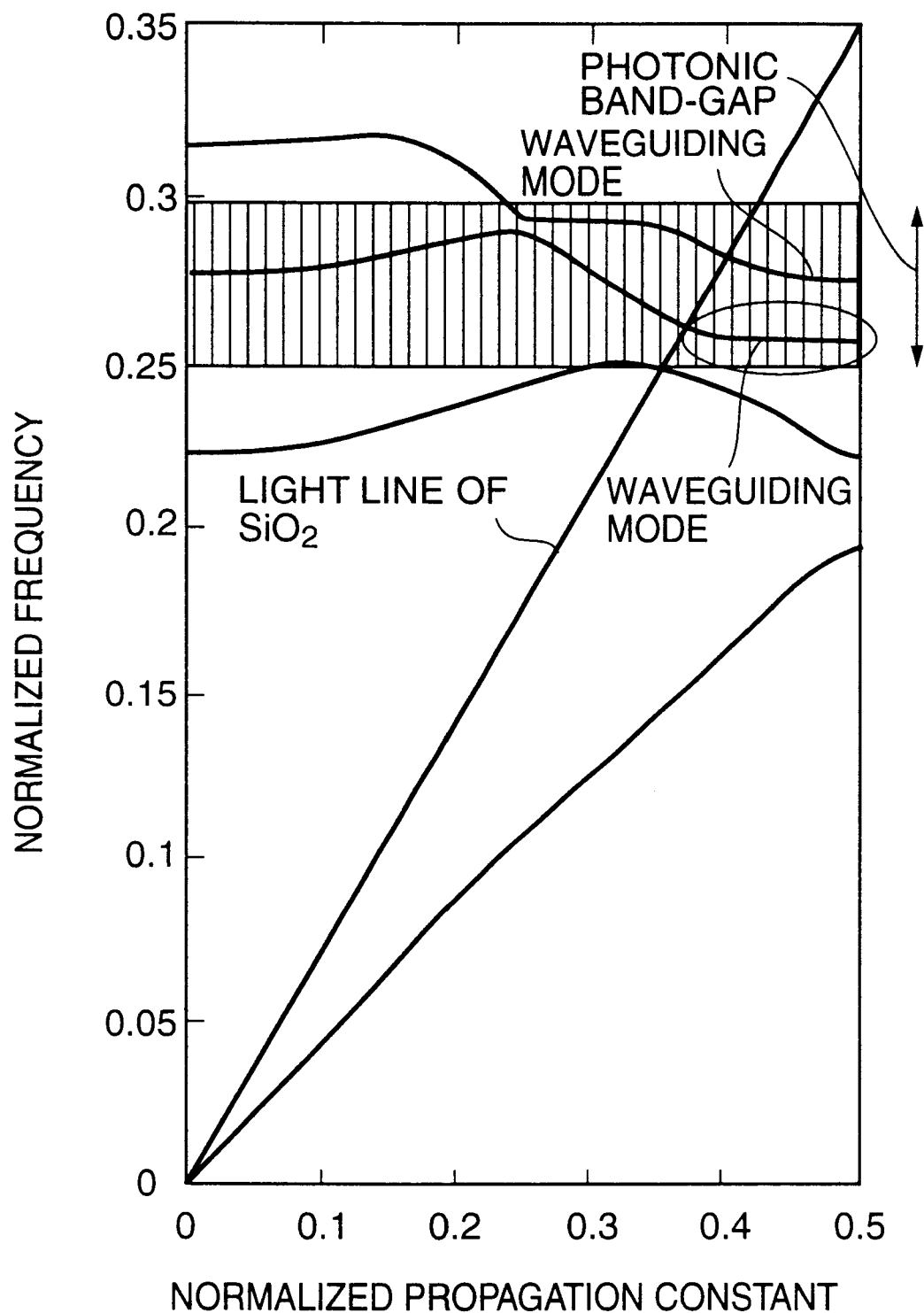
FIG. 7 is a figure for explaining FIG. 6.

FIG. 6 shows a dispersion relation of waveguiding modes of the single missing-hole line defect photonic crystal waveguide according to the first embodiment of the present invention. FIG. 2 can be represented as FIG. 7 for comparing with FIG. 6. The light line of the cladding ($SiO_2$ in this embodiment) is overlaid on FIG. 7 like in FIG. 6. As shown in FIG. 7, a waveguiding mode (which corresponds to the mode 1 in FIG. 4) below the light line of the normal waveguide (the width is 1.0W) has small inclination. On the other hand, according to the present invention shown in FIG. 6, a waveguiding mode which has large inclination, that is, which has large group velocity exists below the light line in the photonic band-gap. In addition, it is clear from the figure that the single-mode condition is satisfied in the region.

A wavelength region in which light transmission was detected in an experiment is the same as the region where this waveguiding mode exists. This shows that the light transmission is realized since the single waveguiding mode having large group velocity is formed by decreasing the width of the line defect (optical waveguide part). As a result of calculating waveguiding mode dispersion by a finite-difference time-domain method and the plane wave expansion method by using various structural parameters, it was found that a waveguiding mode having large group velocity below the light line can be formed when the width of the line defect (optical waveguide part) is set as a value from 0.50W to 0.85W. In addition, light propagation was observed within the width range in experiments.

FIGS. 8A and 8B show results of theoretical calculation of waveguiding mode dispersion in the cases where the width of the optical waveguide part is 0.85W and 0.50W. FIG. 8A shows the case of 0.85W and FIG. 8b shows the case of 0.50W. When the width of the optical waveguide part is a value between 0.85W and 0.50W, the transmission bandwidth of the waveguiding mode is wider than those of the cases shown in FIGS. 8A and 8B as shown in FIG. 6 (0.7W), for example. Therefore, it can be understood that the waveguide having the line defect within the width range practically functions.

The reason that the above-mentioned effect can be obtained by narrowing the width is as follows.

As described in the related art, in the typical (normal) single-line defect state as shown in FIG. 2, the mode (circled mode in FIG. 2) in the low frequency region below the light line within the photonic band-gap has very small group velocity. Thus, this mode is not practical. Here, a waveguiding mode in the outside of the band-gap having large group velocity is considered.

To narrow the width of the line defect is equivalent to decreasing refractive index. Thus, the mode of the lowest mode in FIG. 2 can be shifted to the high frequency side by narrowing the width. Accordingly, this mode can be used within the photonic band-gap and below the light line. Therefore, it becomes possible that a mode having large group velocity can be realized within the band gap and below the light line.

The refractive index of the waveguide can also be lowered by using a medium of low refractive index in the waveguide part, by providing holes in the line defect and the like. A method corresponding to providing holes in the line defect will be described in the third embodiment.

<Second Embodiment>

Next, the second embodiment of the present invention will be described.

Figure 9A:
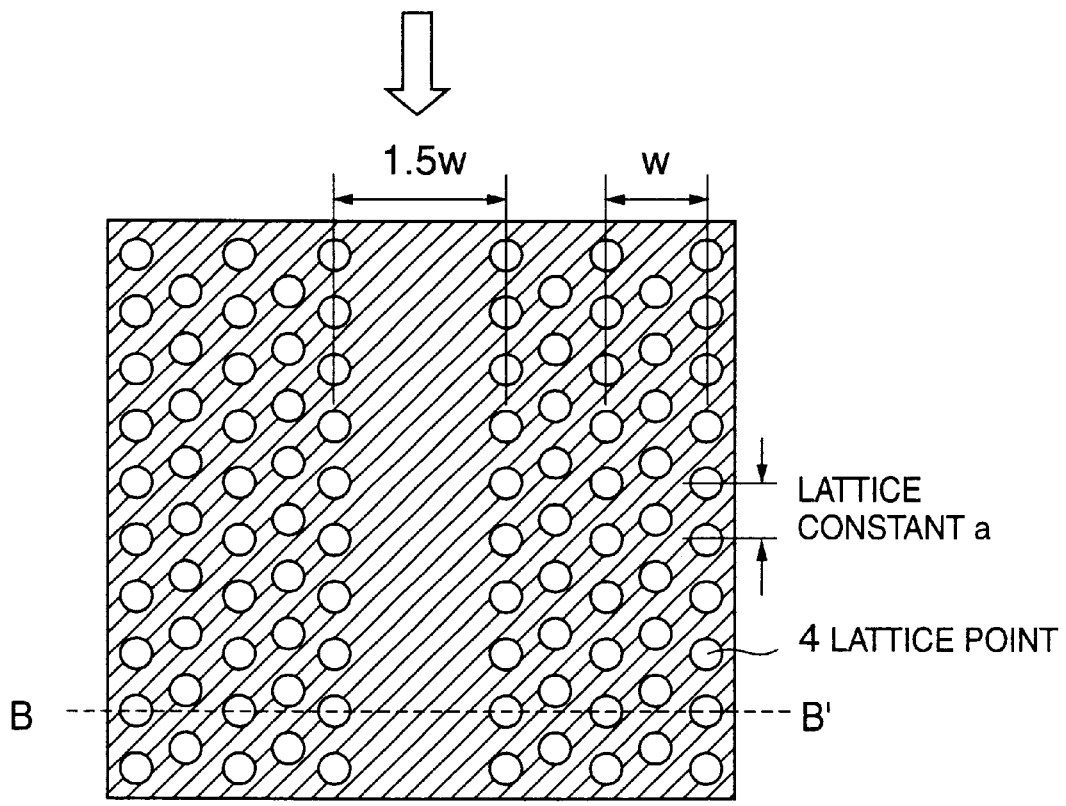
Figure 9B:
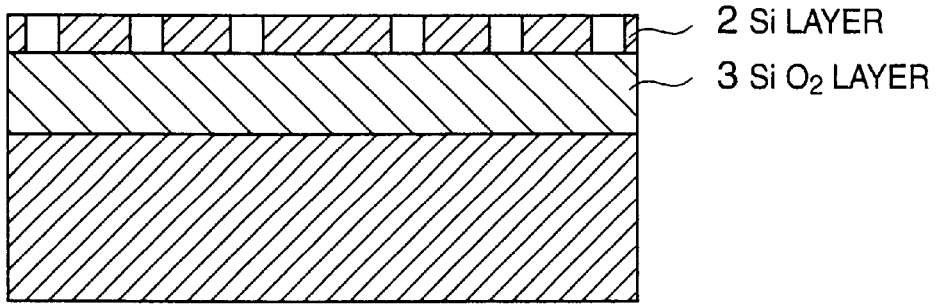

FIGS. 9A and 9B are figures showing a structure of a single missing-hole line defect photonic crystal waveguide 1A according to a second embodiment of the present invention. FIG. 9A shows a top view and FIG. 9B shows a B–B' section view. In this embodiment, when forming single line defect in an two-dimensional photonic crystal slab on oxide cladding, width of the line defect is widened by shifting the whole crystal lattice of both sides of the line defect. As a result, single waveguiding mode having a large group velocity can be obtained above the light line of the cladding.

That is, an air-hole triangle lattice photonic crystal of lattice constant a=0.39 μm was manufactured on an SOI substrate consisting of an Si layer 2 of 0.2 μm thickness and an SiO$_2$ layer of 2, 3 μm thickness by electron beam lithography and dry etching, and, various single line defects of various widths were applied to the air-hole triangle lattice photonic crystal. Tuning of the width of the optical waveguide part is performed by shifting crystal lattices of both sides of the line defect by a predetermined distance in a direction perpendicular to the line defect such that the width is widened.

According to the embodiment, the width of the optical waveguide part is 1.5 times of the normal width of a normal optical waveguide part.

Also in this case, the normal width of the line defect of a normal single missing-hole line defect photonic crystal waveguide is defined as a distance between centers of nearest lattice points 4 of both sides of the line defect of a normal single missing-hole line defect photonic crystal waveguide. Width of line defect of this embodiment can be represented by a constant number—times of the normal width W. The photonic crystal itself has the photonic band-gap between a wavelength 1.35 μm and a wavelength 1.57 μm. Thus, transmission of light was not observed in parts having no defect in the crystal within the wavelength range.

Next, light transmission spectrum for each line defect was measured. As for a simple (normal) single line defect (the width is 1.0W), light transmission was not observed in the band-gap frequency range. On the other hand, when using a waveguide having the width of 1.5W, light transmission was clearly observed in a frequency band in the band-gap.

Figure 10:
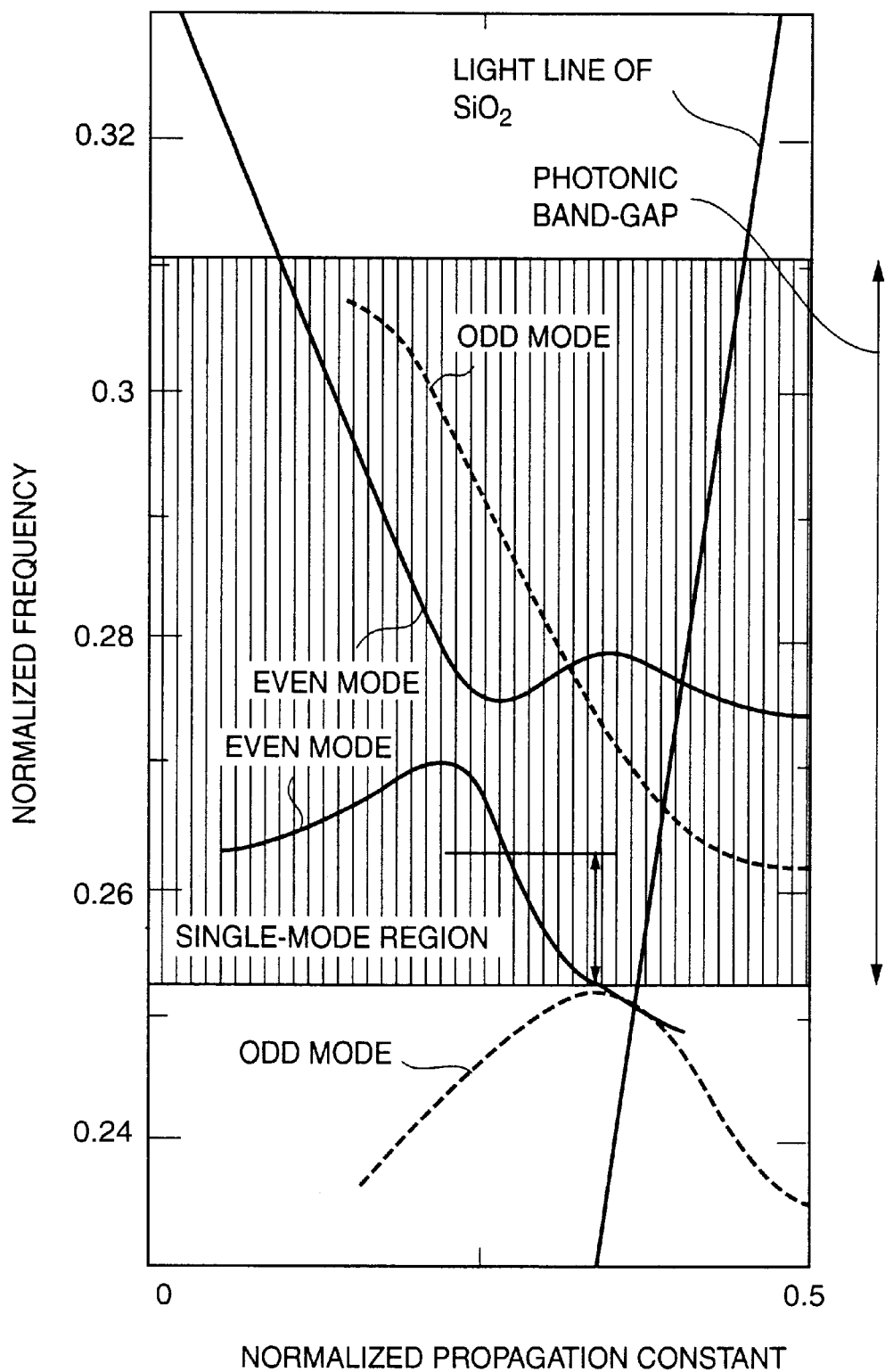
FIG. 10 shows a dispersion relation of waveguiding modes of the single missing-hole line defect photonic crystal waveguide according to the second embodiment of the present invention.

FIG. 10 shows a dispersion relation of waveguiding modes of the single missing-hole line defect photonic crystal waveguide according to the second embodiment of the present invention. The light line of the cladding (SiO$_2$ in this embodiment) is overlaid on FIG. 10 like FIG. 2. The wavelength region in which light transmission was observed by an experiment is the same as a region within which an even mode exists in the single-mode region in FIG. 10. In this case, the single-mode region exists in the photonic band-gap above the light line. However, in this embodiment, the problem of light leaking is solved by widening the width of the optical waveguide part since diffraction loss decreases. That is, a waveguiding mode of low loss can be obtained although the waveguiding mode exists above the light line.

Figure 11:
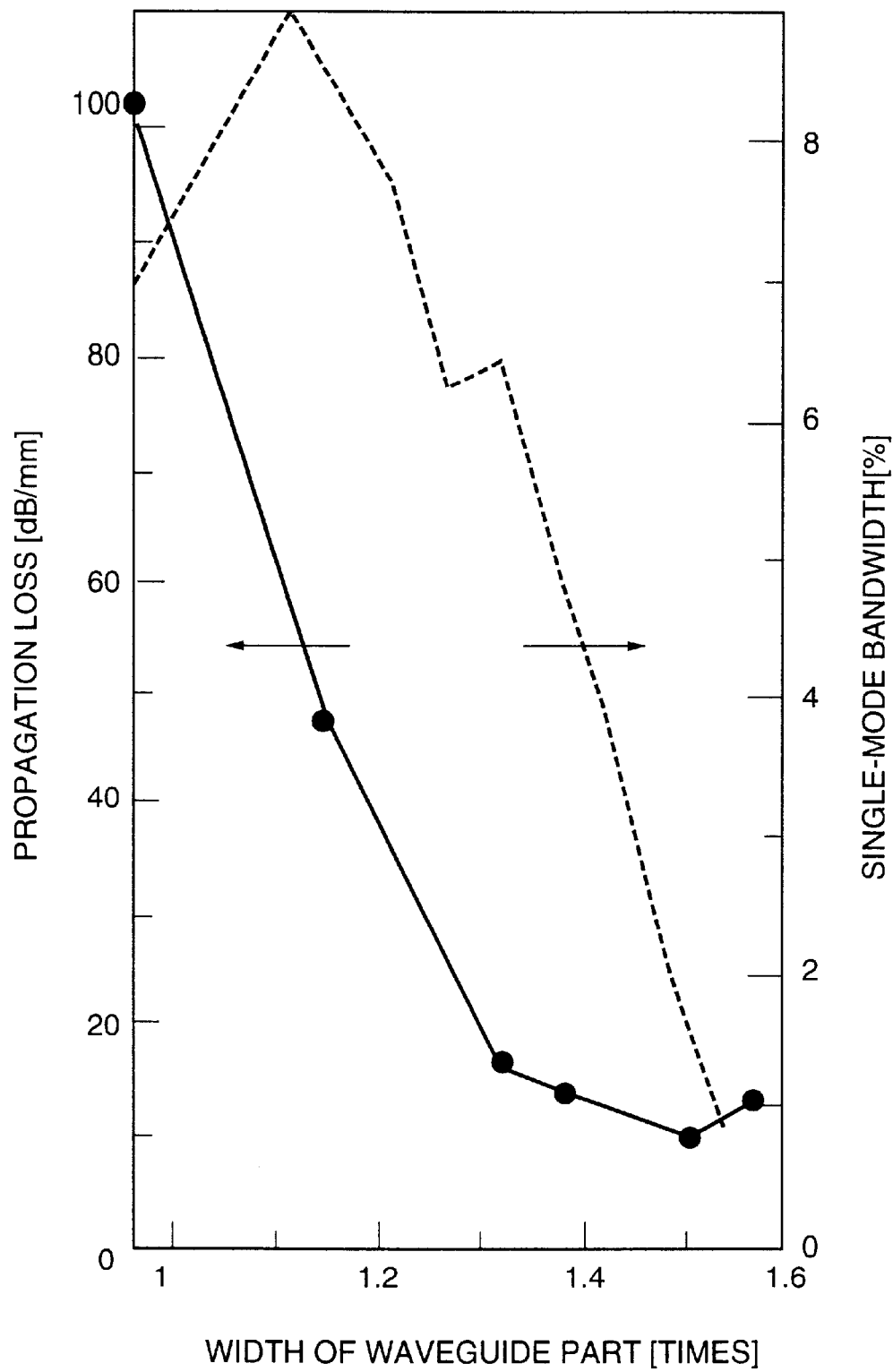
FIG. 11 shows dependence of bandwidth of single-mode above the light line (shown by dotted line) and propagation loss (shown by solid line) on the width of the optical waveguide part according to the second embodiment of the present invention.

FIG. 11 shows dependence of bandwidth of single-mode above the light line (shown by dotted line) and propagation loss (shown by solid line) on the width of the optical waveguide part according to the second embodiment of the present invention. The bandwidth is normalized by a central frequency of the single-mode band. As shown in FIG. 11, as the width is widened, the bandwidth of the single-mode decreases after increasing, and, then, the single-mode bandwidth can not be obtained when the width exceeds 1.6W. The reason that the single-mode bandwidth changes in this way is that the mode in the photonic band-gap in FIG. 10 shifts to the low frequency side by widening the waveguide width. The propagation loss decreases as the width is widened.

As a result of calculating waveguiding mode dispersion by the finite-difference time-domain method by using various structural parameters, it was found that a waveguiding mode satisfying the single-mode condition can be formed above the light line when the width is set to a value equal to or smaller than 1.6W, and the propagation loss becomes equal to or smaller than 20 dB/mm which is a practical loss when the width is set to a value equal to or larger than 1.3W. In addition, light propagation was observed within the width of this range in experiments. That is, by setting the waveguide width as a value from 1.3W to 1.6W, the waveguiding mode which satisfies the single-mode condition and suppresses propagation loss below the practical loss can be obtained.

It is difficult to realize a structure having a waveguiding mode of large group velocity in the low frequency side of the light line when the width is widened. However, since perturbation caused by the crystal periodicity becomes small by widening the width of the waveguide part, the group velocity is increased and the diffraction loss is suppressed. As a result, as shown in FIG. 10, propagation loss can be effectively decreased even though the single-mode exists above the light line (the high frequency side). However, since effective refractive index of the waveguide increases as the width is widened, the single-mode band shifts to the low frequency side as mentioned above so that the single-mode bandwidth becomes narrow gradually. Therefore, it is necessary that the width is equal to or smaller than 1.6W for realizing the single-mode.

In the following, a calculation method of waveguiding mode dispersion curves (FIGS. 6, 7, 10 and the like) which are used for explanation of the present invention will be described.

The dispersion curve can be obtained by analyzing the Maxwell equation by using a calculation method called FDTD method (Finite-difference Time-domain method). In the following, the analyzing method will be described.

First, analysis on electron band structure in ordinary crystals and the like will be described.

A periodic structure like crystal can be represented by repetition of a unit cell. It is well known that the field in such structure becomes Bloch wave. In band analysis, periodic boundary condition satisfying Bloch condition is applied to boundary of unit cells and fields which satisfies the condition are extracted as eigenmodes. At this time, the subject to be analyzed is Schrödinger equation. Since distribution of spatial potential is different according to material, various band structures may exist. This idea is applied to the photonic crystal which is a periodic dielectric structure. However, since the subject is light instead of electron, the equation to be considered is the Maxwell equation and refractive index (dielectric constant) distribution is used for calculation instead of potential distribution.

Next, a method of extracting the eigenmode by using the FDTD method will be described. By the FDTD method, the Maxwell equation is discretized in time and space into finite-difference equations, and electromagnetic field of light propagating in the structure (space distribution of the refractive index) is obtained by sequential calculation. That is, the FDTD method is not a method for directly obtaining the eigenvalue. However, the method can obtain modes of a given structure in the following way.

First, a proper initial field is given in the structure. After performing the sequential calculation, fields applicable for the structure survive and other fields are not selected. By performing Fourier conversion on time variation of the field, frequency spectrum can be obtained. When there is a field applicable for the structure, a peak appears in the frequency spectrum. Since the Bloch condition used in the calculation is a function of wave number, the frequency at which the peak appears becomes a function of wave number. The band figure of the photonic crystal can be obtained by showing the function.

Next, mode calculation of the two-dimensional photonic crystal waveguide will be described. Basically, the same calculation as the above-mentioned one is performed. However, in the photonic crystal used in the present invention, the line defect is incorporated in the inside of the crystal so that the periodicity is disturbed in the direction perpendicular to the line defect. Therefore, a structure shown in FIGS. 12A–12C is used as the unit cell. That is, the periodic boundary condition which satisfies the Bloch condition is applied in the propagation direction of the light. In the direction perpendicular to the light propagation direction, periodic structure is realized by using mirror boundary in which waveguides are placed such that large interference does not occur, and a region for absorbing leaking light which does not become a mode is provided in the thickness direction.

Figure 1A:
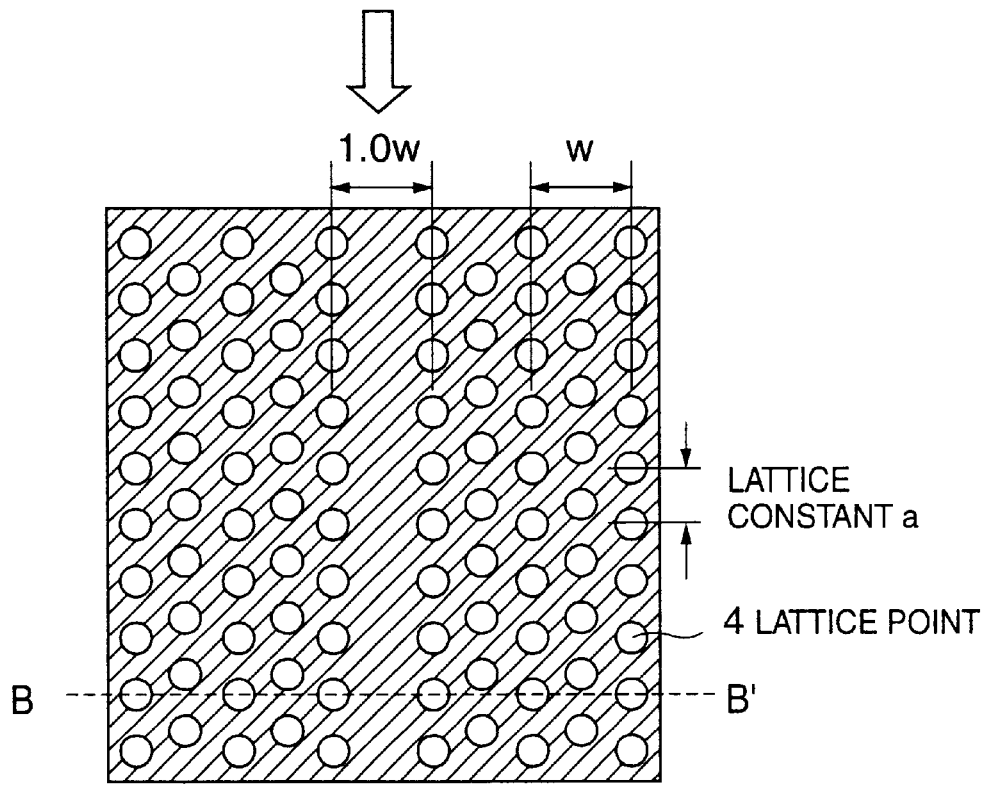
Figure 1B:
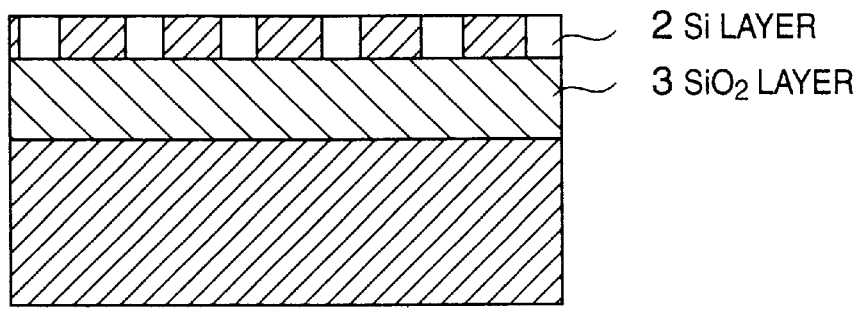

FIG. 12A shows the structure of FIG. 1. FIG. 12B is a magnified view of a part in a dotted line box of FIG. 12A, and FIG. 12C shows stereoscopic view of the structure of FIG. 12B which is the unit cell of the photonic crystal waveguide. The wave number—frequency graph can be obtained by solving the Maxwell equation by the FDTD method for the unit cell. The graph is the dispersion curve described in this specification.

In this calculation, a mode other than the eigenmode can be picked up as a peak of the spectrum if the mode exists for along time in the waveguide. Therefore, analysis for the leaky mode which is above the light line of the cladding layer becomes available. This feature of this method is an advantage point which can not be obtained by other eigenvalue analysis methods. This superiority is applied in this invention. In addition, since lifetime of waveguiding modes in the waveguide can be calculated according to this calculation method, theoretical propagation loss can be presented by using group velocity (energy propagation velocity) obtained by the dispersion curve.

For the waveguide in which the width of the optical waveguide part is narrowed, it was recognized that the single-mode region exists not only in the low frequency side of the light line but also in the high frequency side of the light line.

In the first and second embodiments, the waveguides can be manufactured by using, for example, the Silicon-On-Insulator(SOI) using Si and $SiO_2$ as the medium. However, it is clear that the effect of the present invention can also be obtained by using other materials. Generally, when forming a single-line defect waveguide by using the photonic crystal slab in which a dielectric of low refractive index is placed under thin-film medium of high refractive index, it is possible to form a waveguiding mode which satisfies the single-mode condition above or below the light line by adjusting the width like the above-mentioned embodiments.

For example, semiconductor such as gallium arsenide base compound (GaAs, InGaAs, InGaAsP and the like), indium phosphide base compound (InP and the like) and the like can be used instead of Si. In addition, polymer, alumina and the like can be used instead of $SiO_2$. Further, although $SiO_2$ is used as the bottom cladding and air is used as the top cladding in the embodiments, it is clear that same effect can be obtained if dielectric cladding such as $SiO_2$ is used for both of the top and bottom claddings.

<Third Embodiment>

Next, the third embodiment of the present invention will be described by using examples 3-1–3-2.

Figure 4A:
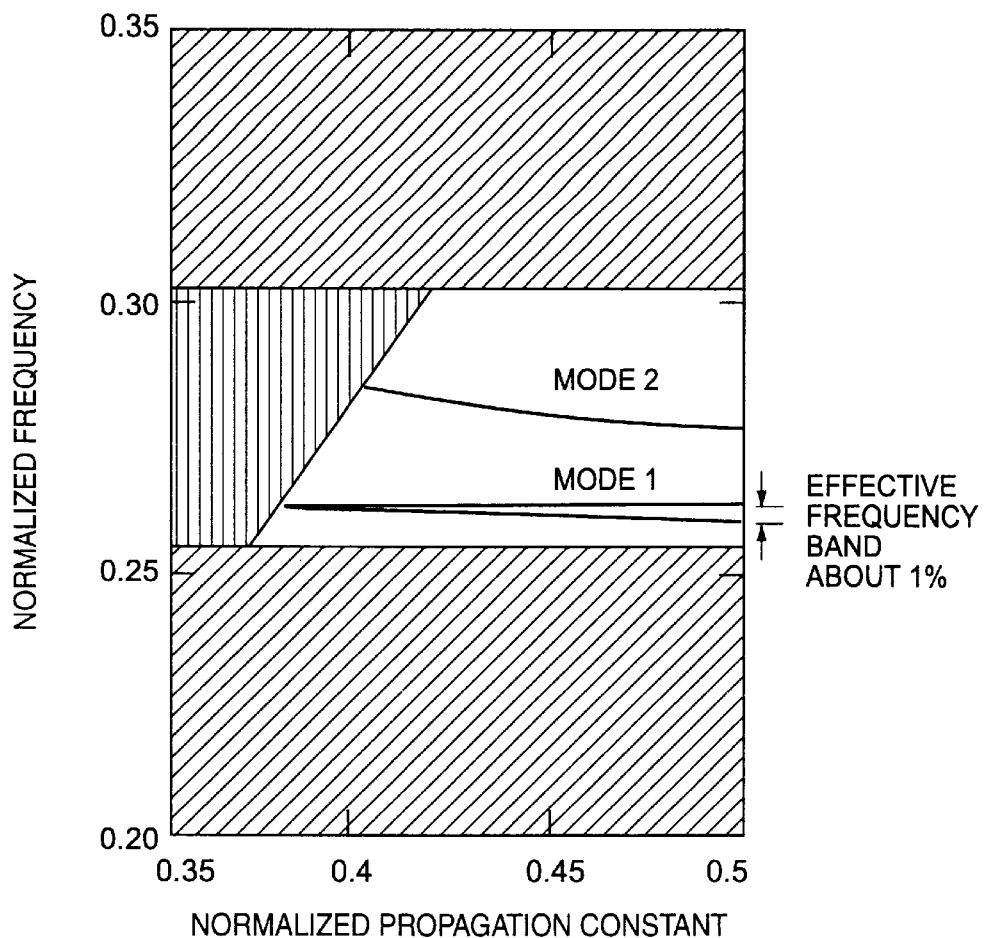
FIGS. 4A–4C are figures for explaining waveguiding modes of the conventional single missing-hole line defect photonic crystal waveguide.
Figure 4B:
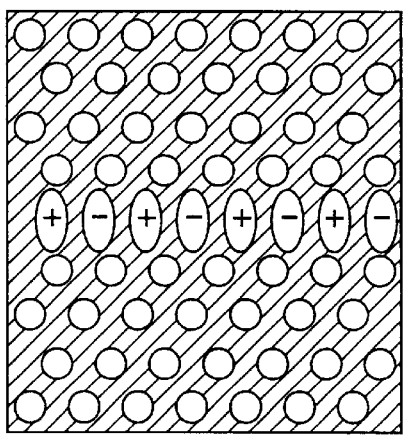
Figure 4C:
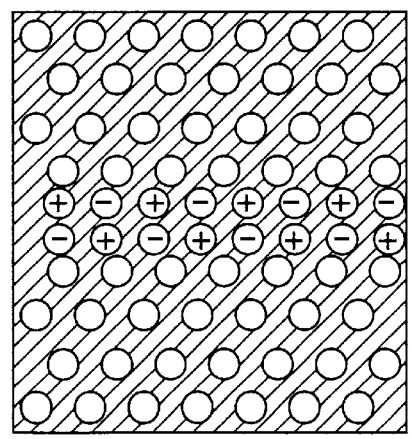

In this embodiment, frequency, group velocity and the like of waveguiding modes can be improved by providing low refractive index cylindrical columns or low refractive index polygon columns in the optical waveguide part of the conventional optical waveguide described in FIGS. 3 and 4.

EXAMPLE 3-1

Figure 13A:
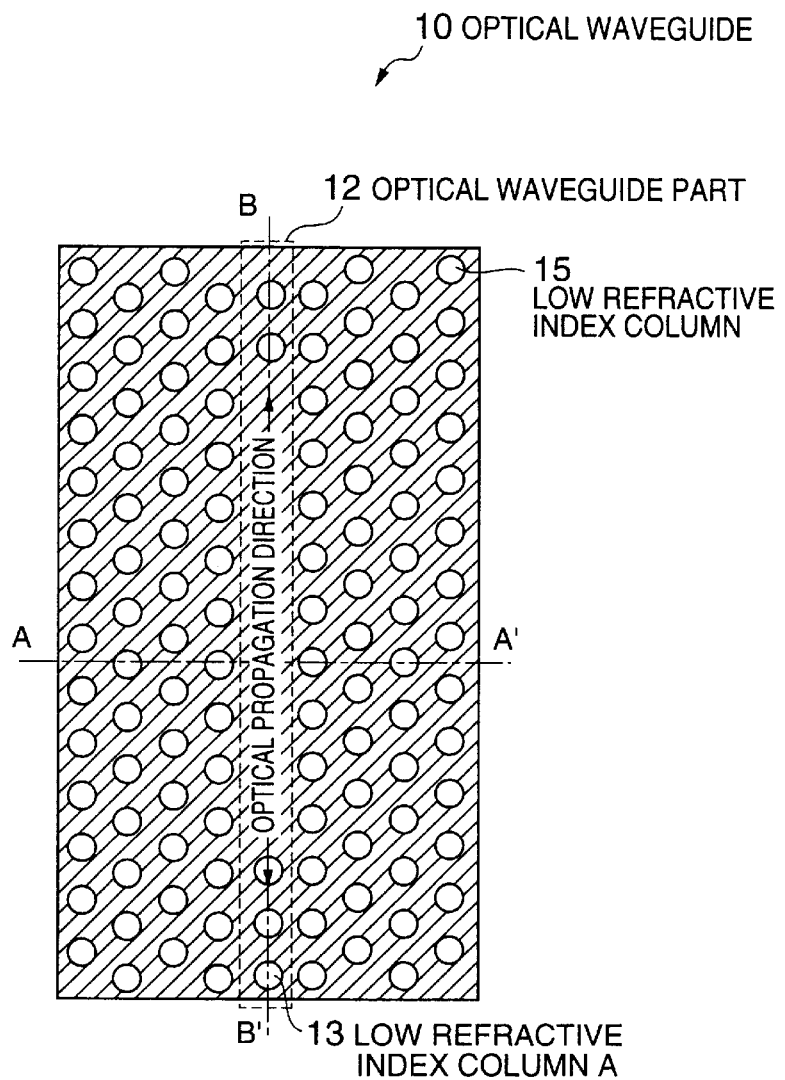
Figure 13B:
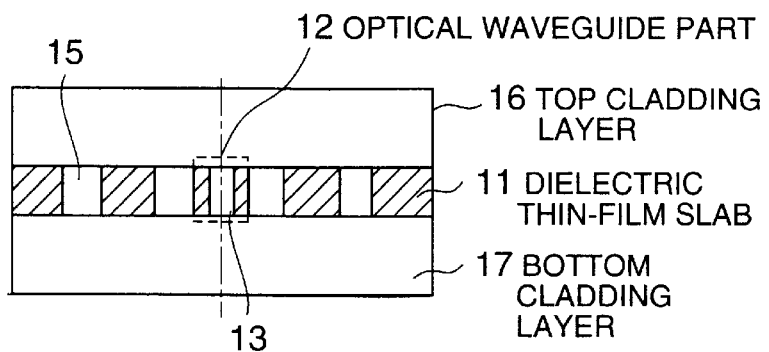

FIGS. 13A–13B are figures for explaining a two-dimensional photonic crystal slab waveguide of the example 3-1. FIG. 13A shows a top view of the optical waveguide, FIG. 13B shows an A–A' section view.

That is, the structure of this embodiment is formed such that cylindrical columns of dielectric having lower refractive index than that of the dielectric thin-film slab is placed in a triangle lattice pattern, and that a single line of the columns in the optical waveguide part 12 in the optical waveguide 10 is moved by a half distance of the period (lattice constant) of the triangle lattice in the propagation direction. In addition, the radius of the columns placed in the moved position is changed as necessary according to optical waveguide characteristics.

Here, as an example, it is assumed that refractive indices of the dielectric thin-film slab 11, the low refractive index column 15, the top cladding layer 16 and the bottom cladding layer 17 and the low refractive index column A13 are $n_1=3.5$, $n_2=1.0$, $n_3=n_4=1.46$, $n_5=1.0$ respectively, and that radius of the low refractive index column 15 is 0.275a and thickness of the dielectric thin-film slab 11 is 0.50a, the radius of the low refractive index column A13 placed in the optical waveguide part 12 is 0.225a. Characteristics of the optical waveguide 10 will be described in the following.

Figure 14A:
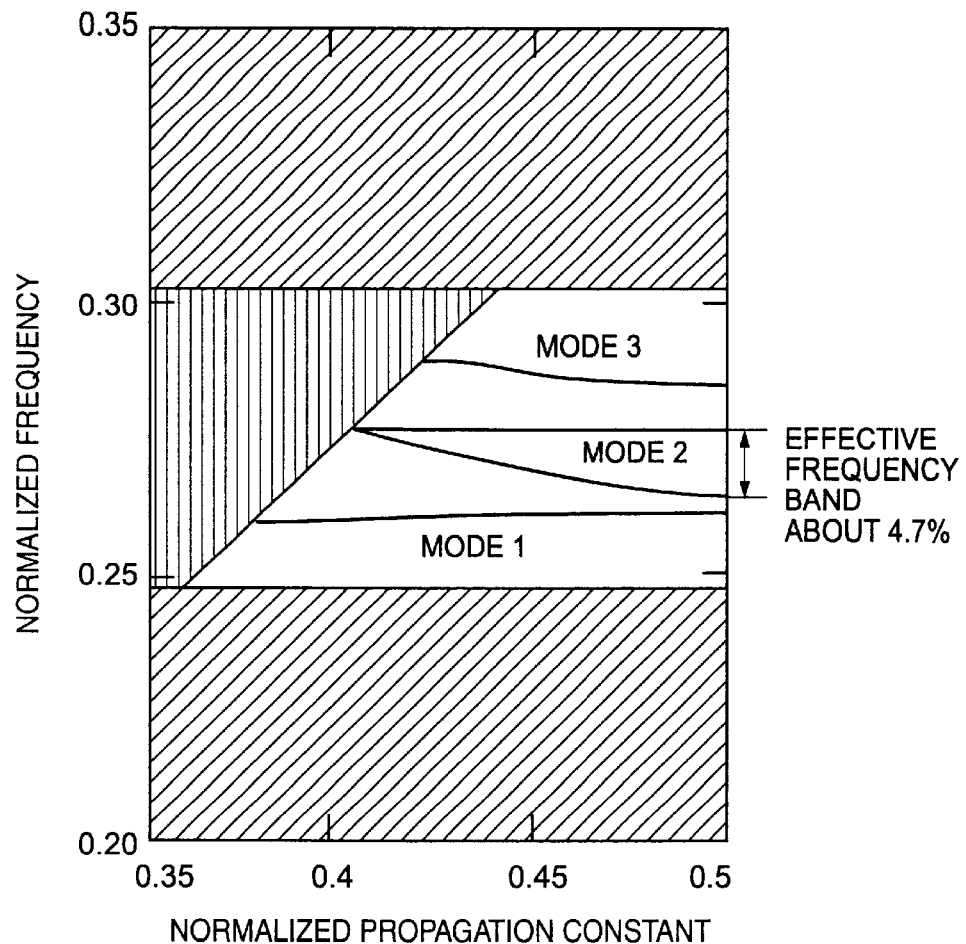
FIGS. 14A–14C are figures for explaining waveguiding modes in the photonic crystal waveguide in the example 3-1.
Figure 14B:
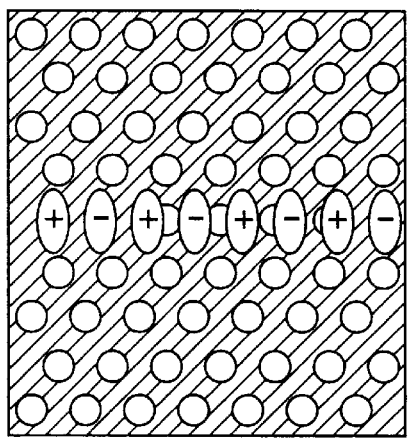
Figure 14C:
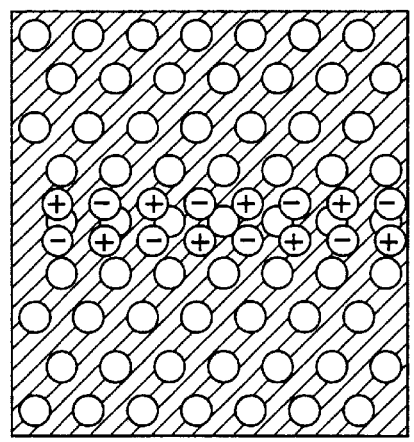

FIGS. 14A–14C are figures for explaining waveguiding modes in the photonic crystal waveguide in the example 3-1. FIG. 14A shows dispersion curves of waveguiding modes. FIG. 14B shows magnetic field component perpendicular to the dielectric thin-film slab in modes 1 and 2 shown in FIG. 14A, and FIG. 14C shows magnetic field component perpendicular to the dielectric thin-film slab in a mode 3 shown in FIG. 14A.

In this case, FIG. 14A shows dispersion curves of waveguiding modes which can pass through the optical waveguide part 12. As shown in FIG. 14A, three waveguiding modes exist. As shown in FIG. 14B, electromagnetic field distribution of the mode 1 and mode 2 which are first and second modes from low frequency side is similar to that of a general single-mode waveguide. Especially, in the second mode (mode 2), change amount of frequency with respect to propagation constant is large in the whole effective propagation constant region. As a result, effective frequency band is enlarged to about 4.7% and the group velocity increases.

When this structure is applied to infrared light for optical communication near 1.55 μm, and, when Si is used for the dielectric thin-film slab 11, air (or vacuum) is used for the low refractive index column 15 and for the low refractive index column A13, and $SiO_2$ is used for the other parts, the period of the triangle lattice becomes about 0.42 μm, the radius of the low refractive index columns 15 becomes about 0.115 μm, the radius of the low refractive index column A13 placed in the optical waveguide part 12 becomes about 0.094 μm. This structure having these values can be manufactured by using a conventional semiconductor processing technology.

In this example, although the radius of the low refractive index column A13 placed in the moved position in the optical waveguide part 12 is 0.225a, it is obvious that frequency band or group velocity can be changed by changing the radius. Considering the structure of the optical waveguide 10, that is, considering a range in which the low refractive index columns A13 placed in the optical waveguide part 12 and other low refractive index columns do not contact with each other, it is practical that the radius of the low refractive index column A13 is about 0.1–0.4 times of the minimum width of the optical waveguide part 12.

In addition, although the cylindrical columns of low refractive index are provided in a triangle lattice pattern in order to form the photonic crystal in the outside of the optical waveguide part 12, polygon columns such as rectangle columns or hexagonal columns can be used instead of the cylindrical columns and same effects can be obtained. In addition, as for the range of the radius of the cylindrical columns or the polygon columns, the same effect can be obtained within a range in which photonic band-gap can exist. When refractive index of the dielectric thin-film slab is about from 3.0 to 4.5 and refractive index of the low refractive index parts is from about 1 to about 1.7, the radius of the columns is about from 0.2a to 0.45a, and it is more practical and effective that the radius of the columns is from 0.275a to 0.375a.

In addition, although cylindrical columns are used for the low refractive index columns A13 which are placed in a moved position in the optical waveguide part 12 in the above-mentioned example, same effect can be obtained when ellipse columns or polygon columns are used instead of the cylindrical columns.

In addition, the refractive index of the columns for forming the photonic crystal, the refractive index of the cladding, and the refractive index of the columns in the optical waveguide part may be the same or may be different as long as they are lower than that of the dielectric thin-film slab. In any case, the same effect can be obtained.

As for materials, when infrared light for communication near 1.55 μm wavelength is used as waveguide light, silicon, germanium, gallium arsenide base compound, indium phosphide base compound, indium antimony base compound and the like can be used as the material of the dielectric thin-film slab which has high refractive index, can transmit infrared light and has few problem in manufacturability and stability. The refractive index of the materials is about from 3.0 to 4.5. In addition, silica, polyimide base organic compound, epoxy base organic compound, acrylic base organic compound, air and vacuum and the like can be used as the material of the parts other than the dielectric thin-film slab which has low refractive index, can transmit infrared light and has few problem in manufacturability and stability. The refractive index of these materials is about from 1.0 to 1.7.

These materials can be also used in the first embodiment and the second embodiment in the same way. In addition, the two-dimensional photonic crystal slab waveguide of the third embodiment can be manufactured by using the Silicon-On-Insulator (SOI) substrate.

EXAMPLE 3-2

Figure 15A:
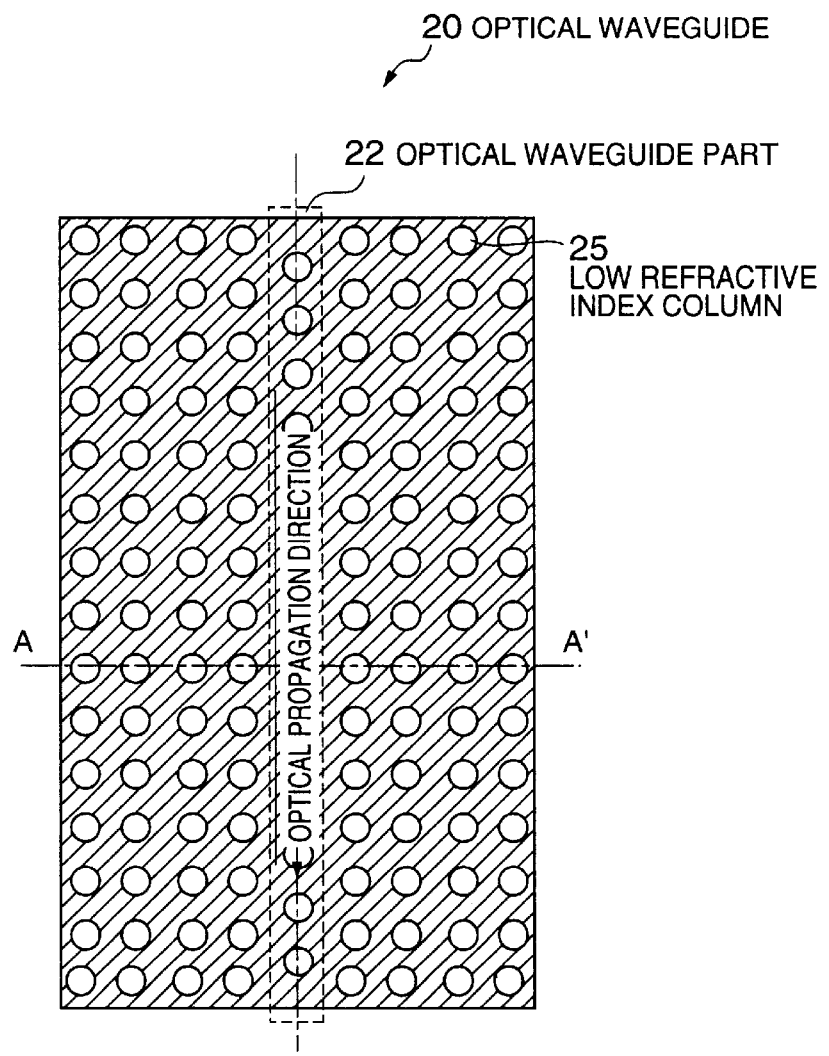
Figure 15B:
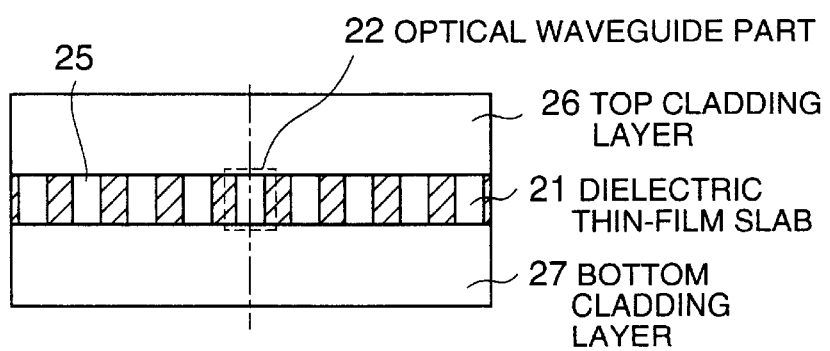

FIGS. 15A–15B are figures for explaining a two-dimensional photonic crystal slab waveguide of the example 3-2. FIG. 15A shows a top view of the optical waveguide, FIG. 15B shows an A–A' section view.

In the example 3-1, although low refractive index region of cylindrical columns or polygon columns is provided in the outside of the optical waveguide part 12 in the triangle lattice pattern in order to realize the photonic crystal, same effect can be obtained by using a square lattice pattern as shown in FIG. 15A instead of the triangle lattice pattern. That is, in a structure in which low refractive index columns 25 having lower refractive index than that of the dielectric thin-film slab 21 are provided in the square lattice pattern and the dielectric thin-film slab 21 is sandwiched by a top cladding layer 26 and a bottom cladding layer 27 having lower refractive index than that of the dielectric thin-film slab 21, a single line of the low refractive index columns 25 which exists in a part to become an optical waveguide part 22 is placed in a position moved by a half distance of the lattice constant of the square lattice from the normal lattice position in the optical propagation direction, in addition, the radius of the moved low refractive index columns is changed as necessary according to waveguide characteristics.

The range of the radius of the low refractive index columns for providing the photonic crystal can be a range which allows existence of photonic band-gap. According to theoretical calculation by the plane wave expansion method, when the refractive index of the dielectric thin-film slab 21 is about from 3 to 4.5, and the refractive index of the other parts is about from 1 to 1.7, the radius of the low refractive index columns 25 is about from 0.35a to 0.45a.

In addition, matters on improvement of waveguide characteristics, shape of the low refractive index column, refractive index of each part, and material of each part described in the example 3-1 hold true in this example since the principle is the same between the examples.

<Effect of the Present Invention>

As mentioned above, the two-dimensional photonic crystal slab waveguide of present invention is formed such that a part of holes in a lattice structure of a two-dimensional photonic crystal slab do not exist linearly so that a line defect is formed, and that a first width which is a distance between centers of nearest two lattice points located on both sides of the line defect is narrower than a second width which is a distance between centers of nearest two lattice points located on both sides of a line defect in a normal two-dimensional photonic crystal slab waveguide which simply lacks holes of a single line. Therefore, an optical waveguide which can form a single waveguiding mode having large group velocity below the light line can be provided.

In addition, by forming the two-dimensional photonic crystal slab waveguide such that the first width is wider than the second width, an optical waveguide which can form a single waveguiding mode having low loss above the light line can be provided.

Also, by shifting positions of low refractive index columns which form one line of the lattice of the two-dimensional photonic crystal slab in the optical propagation direction, or, in addition to that, by changing the radius of the columns, it becomes possible to provide an optical waveguide which can form a single waveguiding mode having large group velocity below the light line.

Therefore, according to the present invention, microminiaturized optical waveguide structure which improves group velocity and has small loss can be provided.

The present invention is not limited to the specifically disclosed embodiments, and variations and modifications may be made without departing from the scope of the invention.

What is claimed is:

1. A two-dimensional photonic crystal slab waveguide in which a part of holes in a lattice structure of a two-dimensional photonic crystal slab do not exist linearly so that a line defect is formed, wherein:

a first width which is a distance between centers of nearest two lattice points located on both sides of said line defect is different from a second width which is a distance between centers of nearest two lattice points located on both sides of a line defect in a normal two-dimensional photonic crystal slab waveguide which simply lacks holes of a single line, wherein said first width is a value from 0.5 times to 0.85 times of said second width.

2. The two-dimensional photonic crystal slab waveguide as claimed in claim 1, said lattice structure is formed by air-hole triangle lattices.

3. The two-dimensional photonic crystal slab waveguide as claimed in claim 1, said two-dimensional photonic crystal slab waveguide includes an oxide cladding or a polymer cladding.

4. The two-dimensional photonic crystal slab waveguide as claimed in claim 3, wherein said two-dimensional photonic crystal slab waveguide is formed by using a Silicon-On-Insulator (SOI) substrate.

5. A two-dimensional photonic crystal slab waveguide in which a part of holes in a lattice structure of a two-dimensional photonic crystal slab do not exist linearly so that a line defect is formed, wherein:

a first width which is a distance between centers of nearest-two lattice points located on both sides of said line defect is different from a second width which is a distance between centers of nearest two lattice points located on both sides of a line defect in a normal two-dimensional photonic crystal slab waveguide which simply lacks holes of a single line;

wherein said first width is wider than said second width in which a single-mode appears in a high frequency side of a light line of cladding in a dispersion relation of waveguiding modes of said two-dimensional photonic crystal slab waveguide having said first width, and said first width is a value from 1.3 times to 1.6 times of said second width.

6. The two-dimensional photonic crystal slab waveguide as claimed in claim 5, said lattice structure is formed by air-hole triangle lattices.

7. The two-dimensional photonic crystal slab waveguide as claimed in claim 5, said two-dimensional photonic crystal slab waveguide includes an oxide cladding or a polymer cladding.

8. The two-dimensional photonic crystal slab waveguide as claimed in claim 7, wherein said two-dimensional photonic crystal slab waveguide is formed by using a Silicon-On-Insulator (SOI) substrate.

9. A two-dimensional photonic crystal slab waveguide in which dielectric cylindrical or polygon columns having lower refractive index than that of a dielectric thin-film slab are provided in said dielectric thin-film slab in a two-dimensional lattice pattern, and said dielectric thin-film slab is sandwiched by a top cladding layer and a bottom cladding layer which have lower refractive index than that of said dielectric thin-film slab, wherein:

dielectric columns in an optical waveguide part in said two-dimensional photonic crystal slab waveguide are located at positions which are shifted in an optical propagation direction from positions at which said dielectric columns should be positioned in a normal two-dimensional photonic crystal slab.

10. The two-dimensional photonic crystal slab waveguide as claimed in claim 9, wherein:

a first diameter of said dielectric columns in said optical waveguide part is different from a second diameter of other dielectric columns located in parts other than said optical waveguide part, and said first diameter is a value by which said dielectric columns does not contact with said other dielectric columns.

11. The two-dimensional photonic crystal slab waveguide as claimed in claim 9, wherein each dielectric column of dielectric columns in said optical waveguide part is apart from a position at which said each dielectric column should be positioned in said normal two-dimensional photonic crystal slab by a half of the lattice constant of said normal two-dimensional photonic crystal slab.

12. The two-dimensional photonic crystal slab waveguide as claimed in claim 9, wherein said dielectric cylindrical or polygon columns are arranged in a triangle lattice pattern having a lattice constant "a", a radius or a half-breadth of said dielectric cylindrical or polygon columns is from 0.2a to 0.45a, and said radius or half-breadth is determined such that said dielectric cylindrical or polygon columns do not contact with dielectric columns in said optical waveguide part.

13. The two-dimensional photonic crystal slab waveguide as claimed in claim 12, wherein:

a refractive index of said dielectric thin-film slab is from 3.0 to 4.5, and each of refractive indices of parts other than said dielectric thin-film slab is from 1.0 to 1.7.

14. The two-dimensional photonic crystal slab waveguide as claimed in claim 9, wherein said dielectric cylindrical or polygon columns are arranged in a square lattice pattern having a lattice constant "a", a radius or a half-breadth of said dielectric cylindrical or polygon columns is from 0.35a to 0.45a, and said radius or half-breadth is determined such that wherein said dielectric cylindrical or polygon columns do not contact with dielectric columns in said optical waveguide part.

15. The two-dimensional photonic crystal slab waveguide as claimed in claim 14, wherein:

a refractive index of said dielectric thin-film slab is from 3.0 to 4.5, and each of refractive indices of parts other than said dielectric thin-film slab is from 1.0 to 1.7.

16. The two-dimensional photonic crystal slab waveguide as claimed in claim 9, wherein:

silicon, germanium, gallium arsenide base compound, indium phosphide base compound, or indium antimony base compound is used as a material of said dielectric thin-film slab, and silica, polyimide base organic compound, epoxy base organic compound, acrylic base organic compound, air or vacuum is used as a material of parts other than said dielectric thin-film slab.

17. The two-dimensional photonic crystal slab waveguide as claimed in claim 16, wherein said two-dimensional photonic crystal slab waveguide is formed by using a Silicon-On-Insulator (SOI) substrate.

* * * * *